United States Patent
Fukazawa et al.

(10) Patent No.: US 10,732,808 B2
(45) Date of Patent: Aug. 4, 2020

(54) INFORMATION PROCESSING DEVICE, INFORMATION PROCESSING METHOD, AND PROGRAM

(71) Applicant: SONY CORPORATION, Tokyo (JP)

(72) Inventors: Ryo Fukazawa, Kanagawa (JP); Kuniaki Torii, Kanagawa (JP); Katsuya Hyodo, Kanagawa (JP); Naoyuki Sato, Tokyo (JP); Akihiko Izumi, Kanagawa (JP); Koichi Kawasaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 149 days.

(21) Appl. No.: 15/311,137

(22) PCT Filed: May 15, 2015

(86) PCT No.: PCT/JP2015/064088
§ 371 (c)(1),
(2) Date: Nov. 14, 2016

(87) PCT Pub. No.: WO2015/198747
PCT Pub. Date: Dec. 30, 2015

(65) Prior Publication Data
US 2017/0075548 A1   Mar. 16, 2017

(30) Foreign Application Priority Data
Jun. 24, 2014 (JP) ................. 2014-129192

(51) Int. Cl.
*G06F 3/042* (2006.01)
*G06F 3/0484* (2013.01)
(Continued)

(52) U.S. Cl.
CPC .......... *G06F 3/04845* (2013.01); *G06F 3/013* (2013.01); *G06F 3/0425* (2013.01);
(Continued)

(58) Field of Classification Search
CPC ....... G06F 3/04845; G06F 2203/04803; G06F 3/013; G06F 3/048; G06F 3/0425;
(Continued)

(56) References Cited

U.S. PATENT DOCUMENTS

| 6,559,870 B1 * | 5/2003 | Anabuki | G06F 3/011 345/419 |
| 8,643,703 B1 * | 2/2014 | Karakotsios | G06F 3/14 345/156 |

(Continued)

FOREIGN PATENT DOCUMENTS

| JP | 2005-141151 | 6/2005 |
| JP | 2013-120968 | 6/2013 |

(Continued)

*Primary Examiner* — Shen Shiau
(74) *Attorney, Agent, or Firm* — Paratus Law Group, PLLC

(57) ABSTRACT

There is provided a display control device, an information processing device, an information processing method, and a program capable of presenting information in a suitable mode according to a positional relationship between a display region and a user, the display control device including: a calculation unit configured to specify a first region in which a user is a reference point; and a display control unit configured to control display of a display object on a display unit according to the specified first region and a second region occupied by the display unit.

32 Claims, 18 Drawing Sheets

US 10,732,808 B2

Page 2

(51) Int. Cl.
*G09G 5/38* (2006.01)
*G06F 3/147* (2006.01)
*G09G 5/14* (2006.01)
*G09G 5/377* (2006.01)
*G06F 3/01* (2006.01)

(52) U.S. Cl.
CPC .......... *G06F 3/04842* (2013.01); *G06F 3/147* (2013.01); *G09G 5/14* (2013.01); *G09G 5/377* (2013.01); *G09G 5/38* (2013.01); *G06F 2203/04803* (2013.01); *G09G 2354/00* (2013.01)

(58) Field of Classification Search
CPC ........ G06F 3/0386; G09G 5/377; G09G 5/38; G09G 5/36
See application file for complete search history.

(56) References Cited

U.S. PATENT DOCUMENTS

| | | | | |
|---|---|---|---|---|
| 9,836,194 B2* | 12/2017 | Hirano | | G06F 3/04842 |
| 10,235,967 B2* | 3/2019 | Nagano | | G09G 5/02 |
| 2005/0212765 A1* | 9/2005 | Ogino | | G06F 3/011 |
| | | | | 345/156 |
| 2009/0106667 A1* | 4/2009 | Lyle | | G06F 3/0488 |
| | | | | 715/750 |
| 2010/0079369 A1* | 4/2010 | Hartmann | | G06F 3/0416 |
| | | | | 345/156 |
| 2010/0103104 A1* | 4/2010 | Son | | G06F 3/014 |
| | | | | 345/158 |
| 2011/0119640 A1* | 5/2011 | Berkes | | G06F 3/011 |
| | | | | 715/863 |
| 2011/0191690 A1* | 8/2011 | Zhang | | G06F 3/00 |
| | | | | 715/746 |
| 2011/0243380 A1* | 10/2011 | Forutanpour | | G06F 3/017 |
| | | | | 382/103 |
| 2012/0249741 A1* | 10/2012 | Maciocci | | G06F 3/011 |
| | | | | 348/46 |
| 2012/0278031 A1* | 11/2012 | Oda | | G06F 3/0416 |
| | | | | 702/150 |
| 2013/0265232 A1* | 10/2013 | Yun | | G09G 3/3208 |
| | | | | 345/158 |
| 2014/0002351 A1* | 1/2014 | Nakayama | | G06F 3/012 |
| | | | | 345/156 |
| 2014/0267004 A1* | 9/2014 | Brickner | | G06F 3/017 |
| | | | | 345/156 |
| 2015/0074570 A1* | 3/2015 | Takimoto | | G06F 3/0488 |
| | | | | 715/765 |
| 2015/0100926 A1* | 4/2015 | Berkes | | G06F 3/011 |
| | | | | 715/863 |
| 2015/0145762 A1* | 5/2015 | Shimura | | G06F 3/017 |
| | | | | 345/156 |
| 2015/0160721 A1* | 6/2015 | Ishihara | | G06F 3/005 |
| | | | | 345/156 |
| 2015/0304615 A1* | 10/2015 | Hiroi | | H04N 9/3194 |
| | | | | 348/744 |
| 2016/0266734 A1* | 9/2016 | Takeuchi | | H04L 12/1827 |
| 2017/0169794 A1* | 6/2017 | Nagano | | G09G 5/02 |
| 2017/0236492 A1* | 8/2017 | Taki | | G06F 3/048 |
| | | | | 345/428 |
| 2017/0354883 A1* | 12/2017 | Benedetto | | A63F 13/533 |
| 2018/0277032 A1* | 9/2018 | Ng | | G09G 3/002 |

FOREIGN PATENT DOCUMENTS

| | | |
|---|---|---|
| JP | 2013-149016 | 8/2013 |
| JP | 2013-213849 | 10/2013 |
| JP | 2014-044735 | 3/2014 |

* cited by examiner

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2015/064088 (filed on May 15, 2015) under 35 U.S.C. § 371, which claims priority to Japanese Patent Application No. 2014-129192 (filed on Jun. 24, 2014), which are all hereby incorporated by reference in their entirety.

TECHNICAL FIELD

The present disclosure relates to an information processing device, an information processing method, and a program.

BACKGROUND ART

In recent years, multi-window systems which simultaneously present a plurality of windows as a user interface (UI) of an operating system (OS) which provides an execution environment of an application have been widespread.

Also, a device to be used as the execution environment of the application in recent years is not limited to a so-called personal computer (PC). Specific examples of the device include a portable terminal such as a smartphone or a tablet, a wearable terminal, a projector which projects information onto a wall surface or the like, a tabletop display, etc., and a size or a form of use of the device are diverse.

CITATION LIST

Patent Literature

Patent Literature 1: JP 2014-44735A

SUMMARY OF INVENTION

Technical Problem

On the other hand, with the diversification of the device, the user need not necessarily use the device so that he/she always faces a display region (e.g., ! a display) in which the device displays information or information displayed in the display region according to the size or the form of use of the device. In particular, if the display region is configured to be arranged along a horizontal plane as in the tabletop display, a device may be configured so that the user can refer to the display region in any direction on the horizontal plane.

Thus, a mechanism capable of presenting information to the user in a suitable mode by controlling a position or an orientation (in other words, a layout) in which the information is displayed according to a positional relationship between the display region of the device and the user is required.

Therefore, the present disclosure provides an information processing device, an information processing method, and a program capable of presenting information in a suitable mode according to a positional relationship between a display region and a user.

Solution to Problem

According to the present disclosure, there is provided a display control device including: a calculation unit configured to specify a first region in which a user is a reference point; and a display control unit configured to control display of a display object on a display unit according to the specified first region and a second region occupied by the display unit.

According to the present disclosure, there is provided a display control method including: specifying a first region in which a user is a reference point; and controlling, by a processor, display of a display object on a display unit according to the specified first region and a second region occupied by the display unit.

According to the present disclosure, there is provided a program for causing a computer to execute: specifying a first region in which a user is a reference point; and controlling display of a display object on a display unit according to the specified first region and a second region occupied by the display unit.

Advantageous Effects of Invention

According to the present disclosure as described above, an information processing device, an information processing method, and a program capable of presenting information in a suitable mode according to a positional relationship between a display region and a user are provided.

Note that the effects described above are not necessarily limitative. With or in the place of the above effects, there may be achieved any one of the effects described in this specification or other effects that may be grasped from this specification.

DESCRIPTION OF EMBODIMENT(S)

Figure 1:
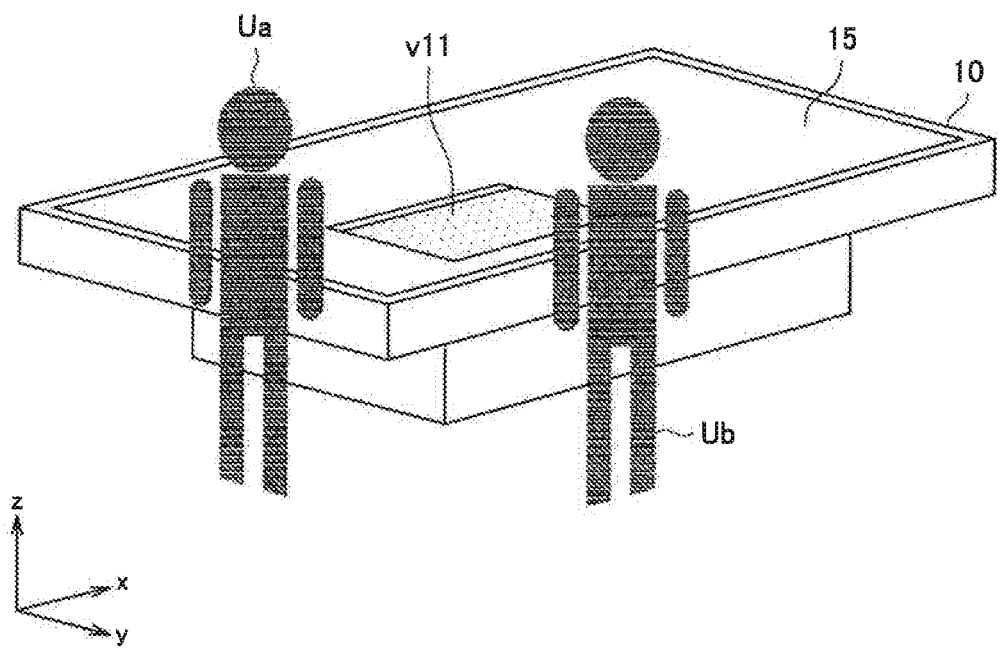
FIG. 1 is an explanatory diagram illustrating an overview of an information processing device according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, the description will be given in the following order.
1. Overview
2. Functional configuration
3. Process
4. Examples
4.1. Example 1: control example in case of plurality of users
4.2. Example 2: example of method of specifying partial region to which display object is allocated
4.3. Example 3: example of control according to configuration of form of use of information processing device
4.4. Example 4: example in which plurality of devices cooperates with one another
5. Hardware configuration
6. Conclusion 1. Overview First, the overview of an information processing device according to an embodiment of the present disclosure will be described with reference to FIG. 1. FIG. 1 is an explanatory diagram illustrating the overview of the information processing device 10 according to the embodiment of the present disclosure. Also, in the example illustrated in FIG. 1, an xy plane formed in an x-direction and a y-direction orthogonal to each other is designated as a horizontal plane and a direction perpendicular to the xy plane (that is, a vertical direction) is designated as a z-direction.

The information processing device 10 according to the present embodiment corresponds to, for example, a device to be used as an execution environment of an application. Also, the information processing device 10 is configured to be able to simultaneously present a plurality of display objects such as a window or a dialog corresponding to an application in execution and a notification for providing the notification of information as in a so-called multi-window system.

On the other hand, a size or a form of use of the information processing device 10 to be used as the execution environment of the application is diversified. Thus, the user need not necessarily use the information processing device 10 so that he/she always faces the display unit 15 of the information processing device 10 or information (a display object) displayed in a display region of the display unit 15 according to the size or the form of use of information processing device 10. Also, hereinafter, the "display object displayed in the display region of the display unit 15" may be simply referred to as the "display object displayed on the display unit 15."

For example, FIG. 1 illustrates an example of the information processing device 10 including the display unit 15 relatively larger than the user (i.e., users Ua and Ub in FIG. 1). Also, in the example illustrated in FIG. 1, the information processing device 10 is constituted of a so-called tabletop display configured so that the display unit 15 is arranged along the xy plane (the horizontal plane). Also, in the following description, the information processing device 10 will be described under an assumption that the display region of the display unit 15 is constituted of a touch panel.

If the display unit 15 is relatively larger than the user (for example, if the extent of the display unit 15 is wider than a range in which the hand of the user can reach without movement of the user) as illustrated in FIG. 1, the user uses a part of the display unit 15 as a workspace in many cases. Also, in the example as illustrated in FIG. 1, it may be difficult to place the entire display unit 15 in a field of view of the user during the work. Thus, for example, it may be desirable that the display position of the display object be controlled so that the display object is displayed in the vicinity of the user.

Also, if the information processing device 10 is configured so that the display unit 15 is arranged along the xy plane (the horizontal plane) as illustrated in FIG. 1, the user can refer to the display unit 15 in any direction on the xy plane. Thus, the information processing device 10 may be configured to be able to change the orientation of the display object displayed on the display unit 15 along the xy plane (i.e., may configure the display object to be rotatable on the xy plane).

For example, in the example illustrated in FIG. 1, a display object v11 is displayed on the display unit 15 so that a top/bottom direction is correct with respect to the user Ub who refers to the display unit 15 from the y-direction. On the other hand, in the example illustrated in FIG. 1, the user can refer to the display unit 15 from any direction on the xy plane. Thus, for example, if the display object v11 is presented to the user Ua who refers to the display unit 15 from the x-direction, it may be desirable that the orientation of the display object v11 be controlled so that the top/bottom direction is correct with respect to the user Ua.

Also, the characteristic of the task associated with the display object displayed on the display unit 15 is not always uniform. For example, a display object associated with a task for only presenting information to the user, a display object associated with a task for receiving an operation of the user, etc. are included.

As a specific example, in a player for reproducing a moving image, a display object for reproducing content of the moving image and a display object (a so-called controller) for enabling the user to issue an instruction of reproducing or stopping the moving image may be separately displayed. In this case, the display object for reproducing the content of the moving image corresponds to a display object associated with the task for only presenting information to the user. Also, the display object for enabling the user to issue an instruction for reproducing or stopping the moving image corresponds to the display object associated with the task for receiving the operation of the user.

In this case, for example, it may be desirable that the display object associated with the task for receiving the operation of the user be displayed in a range in which the user can perform an operation (for example, a range in which the hand of the user can reach). On the other hand, the display object associated with the task for only presenting information to the user need not be necessarily displayed in the range in which the user can perform an operation as long as the display object is displayed at a position at which the display object is placed in a field of view of the user.

In view of the above situation, an objective of the information processing device 10 according to the present embodiment is to present information to the user in a suitable mode by controlling the position or the orientation of the display object in the display unit 15 according to the position or the orientation of the user with respect to the display unit 15. Also, hereinafter, the position and the orientation of the user with respect to the display unit 15 may be collectively referred to as a "relative position" of the user to the display unit 15. That is, if they are referred to as the "relative position of the user to the display unit 15," it is assumed to able to include one or both of the "position of the user with respect to the display unit 15" and the "orientation of the user with respect to the display unit 15."

Figure 2:
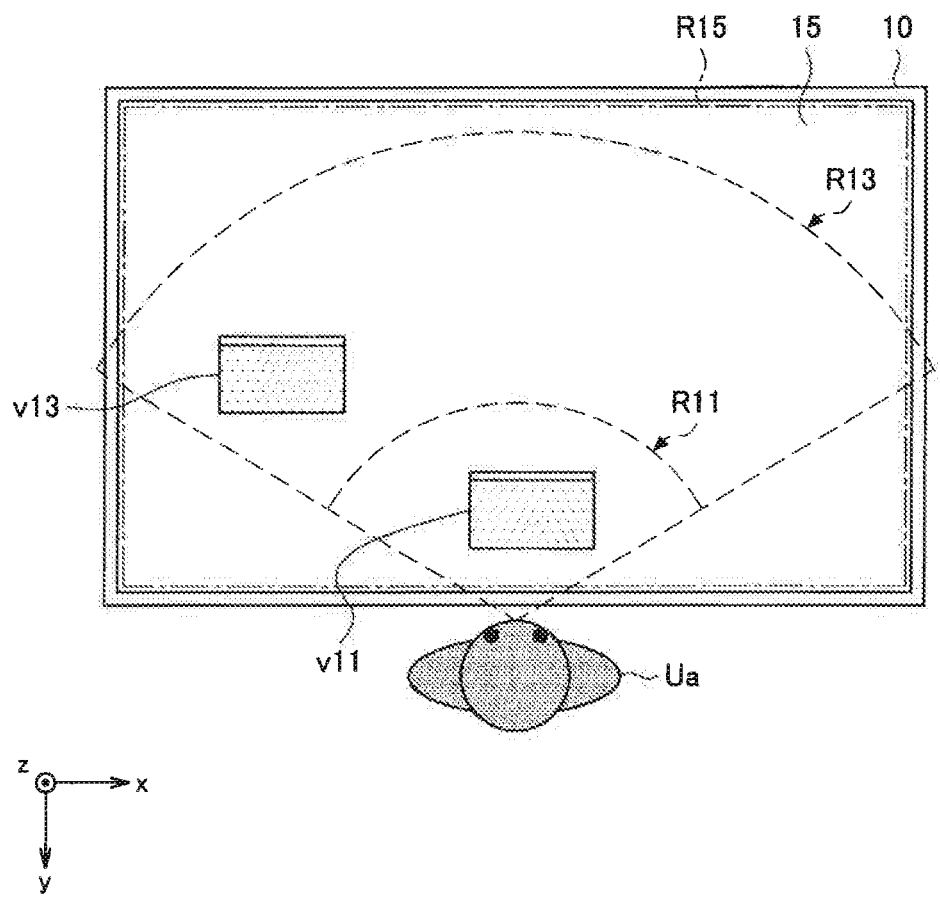
FIG. 2 is an explanatory diagram illustrating an overview of an operation of the information processing device according to the embodiment.

For example, FIG. 2 is an explanatory diagram illustrating an overview of an operation of the information processing device 10 according to the embodiment, and illustrates an example of an operation in which the information processing device 10 controls the display of the display object on the display unit 15 according to the relative position of the user to the display unit 15. Also, FIG. 2 illustrates a schematic configuration when the information processing device 10 illustrated in FIG. 1 is viewed from an upper side of the z-direction (a side facing the display unit 15, i.e., above the display unit 15). Also, in the following description, in FIG. 2, the lower side of the drawing is a + side of the y-direction, the upper side of the drawing is a − side of the y-direction, the right of the drawing is a + side of the x-direction, and the left of the drawing is a − side of the x-direction.

The information processing device 10 according to the present embodiment captures, for example, images of a display region R15 of the display unit 15 and a region around the display unit 15 using an imaging unit, and recognizes a relative position of the user Ua to the display unit 15 by analyzing the captured images.

As a specific example, it is only necessary to provide the imaging unit above the display unit 15 (an upper side in the z-direction) and it is only necessary to configure the imaging unit to capture images of the display unit 15 and a region around the display unit 15 in the case of examples of FIGS. 1 and 2. In this case, it is only necessary for the information processing device 10 to recognize the relative position of the user Ua to the display unit 15 by extracting the display unit 15 and the user Ua on the basis of, for example, pattern matching or so-called human recognition technology, from among the captured images.

Also, its method is not necessarily limited to a method based on a result of analyzing the image captured by the imaging unit as long as the information processing device 10 can recognize the relative position of the user Ua to the display unit 15. As a specific example, the information processing device 10 may recognize the relative position of the user Ua to the display unit 15 using various sensors such as a distance sensor, a proximity sensor, and a human detection sensor.

Also, the information processing device 10 specifies a range in which the position of the user Ua is a reference point according to the result of recognizing the relative position of the user Ua to the display unit 15. Also, the range in which the position of the user is the reference point corresponds to an example of a "first region."

For example, in the example illustrated in FIG. 2, the information processing device 10 specifies a range R11 in which the operation of the user Ua is possible and a range R13 in which browsing of the user Ua is possible using the position of the user Ua as the reference point. Also, hereinafter, the range R11 in which the operation of the user is possible may be referred to as an "operable range R11 of the user." Likewise, the range R13 in which the user can browse the display object may be referred to as a "browsable range R13 of the user." Also, the operable range R11 of the user corresponds to an example of a "third region" and the browsable range R13 of the user corresponds to an example of a "fourth region."

Also, the information processing device 10 may specify the operable range R11 of the user Ua or the browsable range R13 of the user Ua by analyzing, for example, the image of the user Ua imaged by the imaging unit. In this case, the information processing device 10 may calculate, for example, a length of an arm of the user Ua by analyzing the captured image and specify a range in which the hand of the user Ua can reach as the operable range R11 of the user Ua using the position of the user Ua as the reference point on the basis of the calculation result. Also, at this time, the information processing device 10 may use a preset value calculated on the basis of statistics or the like as the length of the arm of the user Ua. Also, as another example, the information processing device 10 may record a history of a position touched by the user Ua (e.g., a touch position on a touch panel) and specify the operable range R11 of the user Ua on the basis of the history.

Also, the information processing device 10 may detect the orientation of a human body or a head of the user Ua by analyzing the captured image and specify a range capable of being placed in a field of view of the user Ua as the browsable range R13 of the user Ua using the position of the user Ua as a reference point on the basis of the detection result. In this case, it is only necessary for the information processing device 10 to calculate the field of view of the user Ua by assuming that the field of view of the user Ua is widened in a direction indicated by the detected orientation of the human body or the head of the user Ua using the position of the user Ua as a reference point. Also, it is only necessary to use a preset value calculated on the basis of, for example, statistics or the like, as the viewing angle of the user Ua.

Also, the information processing device 10 recognizes a range in which its own (i.e., the information processing device 10) can receive an input of the user and a range in which information can be presented to the user on the basis of an operation device for operating its own or a type or a form of use of the display unit 15. For example, in the example illustrated in FIG. 2, the display region of the display unit 15 is constituted of the touch panel. Thus, the display region of the display unit 15 denoted by reference sign R15 in FIG. 2 is a range in which the information processing device 10 can receive an input of the user and corresponds to a range in which the information processing device 10 can present the information to the user.

The information processing device 10 controls the display of the display object on the display unit 15 on the basis of at least one of the specified operable range R11 and the specified browsable range R13 of the user Ua and the display region R15 of the display unit 15.

As a specific example, as illustrated in FIG. 2, the information processing device 10 causes the display object v11 associated with the task for receiving an operation of the user to be displayed within a range in which the operable range R11 of the user Ua overlaps the display region R15 (in other words, a range in which the information processing device 10 can receive the input of the user). Also, at this time, the information processing device 10 may control the display position of the display object v11 so that at least a part (an interface) for receiving the operation of the user in the display object v11 is included within the range in which the operable range R11 of the user Ua overlaps the display region R15.

Also, the information processing device 10 may control the orientation of the display object v11 so that the top/bottom direction is correct with respect to the user Ua on the basis of the orientation of the user Ua for the display unit 15 if the display object v11 is displayed on the display unit 15.

Through this configuration, the user Ua can perform an operation on the display object v11 without the movement of the position for the display unit 15 or an operation such as layout adjustment of a display object.

Also, the information processing device 10 causes a display object v13 associated with a task for only presenting information to be displayed within a range in which the browsable range R13 of the user Ua overlaps the display region R15 (in other words, a range in which the information processing device 10 can present information to the user). At this time, the information processing device 10 can cause the display object v13 to be displayed in a region which is within a range in which the browsable range R13 of the user Ua overlaps the display region R15 and which is outside the operable range R11 of the user Ua. Thereby, the information processing device 10 can effectively utilize the range in which the operable range R11 of the user Ua overlaps the display region R15 as a region for displaying the display object v11 associated with the task for receiving the operation of the user.

Also, if the display object v13 is displayed on the display unit 15, the information processing device 10 may control the orientation of the display object v13 so that the top/bottom direction is correct with respect to the user Ua as in the case of the display object v11.

Also, an example of the information processing device 10 in which the display region R15 of the display unit 15 is constituted of the touch panel has been described above, but a device for inputting information to the information processing device 10 is not necessarily limited to the touch panel.

For example, an input device for enabling the information processing device 10 to receive the input of the user and an output device for enabling the information processing device 10 to present information to the user may be constituted of different devices. In this case, the range in which the information processing device 10 can receive the input of the user is specified on the basis of a position or a form of use of the input device. As a specific example, if the keyboard is applied as the input device, a region in which each key of the keyboard is provided corresponds to a range in which the information processing device 10 can receive the input of the user. Likewise, the range in which the information processing device 10 can present information to the user is specified on the basis of a position or a form of use of the output device.

Also, hereinafter, the range in which the information processing device 10 can receive the input of the user may be referred to as an "operable range R11 of the device." Likewise, the range in which the information processing device 10 can present information to the user may be referred to as a "browsable range R13 of the device." Also, as illustrated in FIG. 2, if the touch panel is applied as the input device, i.e., if the same regions as the operable range R11 and the browsable range R13 are indicated, they may be simply referred to as a "display region R15." Also, the browsable range R13 of the device corresponds to an example of a "second region."

As described above, the information processing device 10 according to the present embodiment can present information to the user in a suitable mode by controlling the position or the orientation of the display object in the display unit 15 according to the position or the orientation of the user with respect to the display unit 15. Therefore, hereinafter, the information processing device 10 according to the present embodiment will be described in further detail.

2. Functional Configuration

Figure 3:
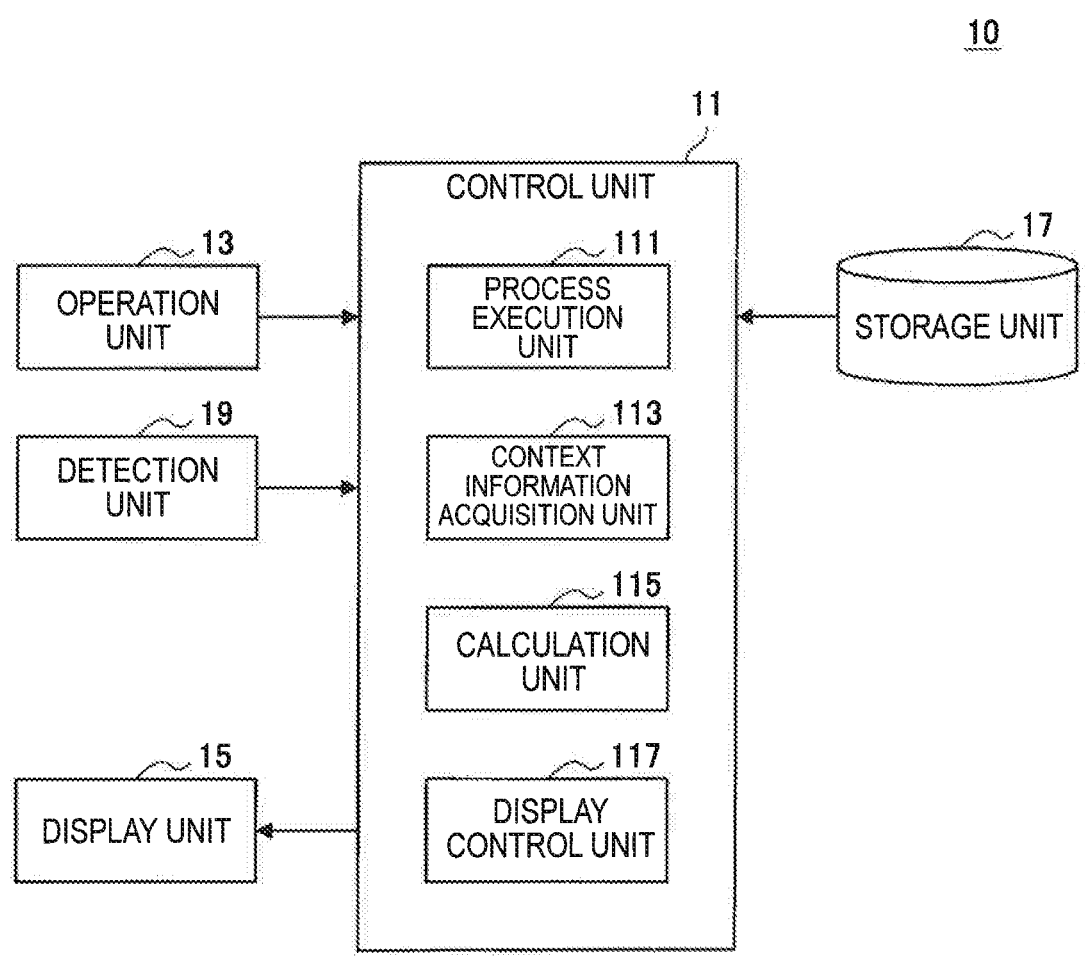
FIG. 3 is a block diagram illustrating an example of a functional configuration of the information processing device according to the embodiment.

First, an example of the functional configuration of the information processing device 10 according to the present embodiment will be described with reference to FIG. 3. FIG. 3 is a block diagram illustrating the example of the functional configuration of the information processing device 10 according to the present embodiment.

As illustrated in FIG. 3, the information processing device 10 includes a control unit 11, an operation unit 13, a display unit 15, a storage unit 17, and a detection unit 19. Also, the control unit 11 includes a process execution unit 111, a context information acquisition unit 113, a calculation unit 115, and a display control unit 117.

The operation unit 13 is an input device for enabling the user to operate the information processing device 10. The operation unit 13 may be constituted of, for example, a button, a touch panel, a mouse, etc. Also, in the present description, an example in which the operation unit 13 is constituted of a touch panel provided in a shape of the display region of the display unit 15 as in FIGS. 1 and 2 will be described.

Also, the display unit 15 is an output device for enabling the information processing device 10 to present information to the user and presents the information to the user by displaying the information in a predetermined display region such as a display panel. The display unit 15 illustrated in FIG. 3 corresponds to the display unit 15 illustrated in FIGS. 1 and 2.

Also, the configuration, the size, the form of use, etc. of the display unit 15 are not particularly limited as long as the information can be presented to the user by displaying the information in the display region. For example, the display unit 15 may be constituted of a liquid crystal display (LCD) device, an organic EL (organic light emitting diode (OLED)) display, or the like. Also, the display unit 15 may be constituted of a so-called projector which presents information to the user by projecting the information onto a projection surface using a wall surface or the like as the projection surface. Also, the display unit 15 may be constituted of a so-called tabletop display provided for a display region (e.g., a display panel) for displaying information to extend in a horizontal direction. Also, an example in which the display unit 15 is provided so that the display region extends in the horizontal direction as illustrated in FIGS. 1 and 2 will be described in the present description.

The storage unit 17 is a recording medium for recording data such as image information such as a still image or a moving image or text information (e.g., data of various types of content). Also, the storage unit 17 may store data of an application to be executed by the information processing device 10.

The detection unit 19 is a component for acquiring control information for specifying a range in which the position of the user Ua is a reference point, i.e., the operable range R11 or the browsable range R13 of the user Ua described above on the basis of FIG. 2. A specific example of the control information includes information for specifying a relative position of the user to the display unit 15. Also, hereinafter, the control information acquired by the detection unit 19 may be referred to as "detection information."

For example, the detection unit 19 may be constituted of an imaging unit which captures images of a display region R15 of the display unit 15 and a region around the display unit 15 as described above. In this case, the captured images correspond to detection information. Also, it is possible to specify a relative position of the user to the display unit 15 as described above from the detection information.

Also, as another example, the detection unit 19 may be constituted of various types of sensors such as a distance sensor, a proximity sensor, a human detection sensor, and an infrared sensor. In this case, a detection signal of the sensor corresponds to the detection information and it is possible to specify, for example, the relative position of the user to the display unit 15 from the detection information.

Of course, the configuration of the detection unit 19 or the type of detection information is not particularly limited as long as it is possible to acquire the detection information for specifying the relative position of the user to the display unit 15.

Also, the detection unit 19 may acquire control information for specifying a direction of a line of sight of the user as an example of information for specifying the browsable range R13 of the user Ua as the detection information. The direction of the line of sight of the user can be specified on the basis of, for example, an orientation of the head of the user or an orientation of an eyeball of the user.

Also, the user can specify the orientation of the head of the user on the basis of, for example, detection results of various types of sensors such as an acceleration sensor and an angular speed sensor for detecting the motion of the head. In this case, the detection signal of the sensor corresponds to the detection information.

Also, the orientation of the head of the user can be specified by analyzing the captured image of the user. Also, it is possible to detect the orientation of the eyeball of the user on the basis of, for example, the position or the orientation of the pupil in the captured image of the eyeball. In these cases, the captured image corresponds to the detection information.

Also, the detection unit 19 may acquire control information for specifying the posture of the user as detection information. Also, it is possible to specify the posture of the user by analyzing, for example, an image obtained by imaging a human body of the user. In this case, the captured image corresponds to the detection information.

The detection unit 19 outputs the acquired detection information to the context information acquisition unit 113 to be described below. Also, the timing at which the detection unit 19 acquires the detection information is not particularly limited. For example, the detection unit 19 may acquire the detection information in real time by sequentially monitoring the positional relationship between the display unit 15 and the user. Also, as another example, the detection unit 19 may acquire the detection information at each predetermined timing. Also, the detection unit 19 may acquire the detection information in conjunction with the execution of the process if a predetermined process is executed.

The process execution unit 111 is a component for executing various types of processes such as applications. The process execution unit 111 extracts a corresponding application from the storage unit 17 on the basis of an instruction from the user via the operation unit 13 and executes the extracted application. The process execution unit 111 outputs a type of task to operate on the basis of the execution of the application or a result of executing the application to the display control unit 117. Also, the process execution unit 111 may output the type of task to operate on the basis of the execution of the application or the result of executing the application to the context information acquisition unit 113 to be described below.

The context information acquisition unit 113 acquires various types of control information for controlling a display position or an orientation of a display object (hereinafter referred to as "context information") after the calculation unit 115 to be described below specifies the relative position of the user Ua to the display unit 15 or a range in which the position of the user Ua is a reference point. The context information includes user information, device information, and task information. Therefore, an example of specific information for each of pieces of the user information, the device information, and the task information and an example of an acquisition source of the information will be described hereinafter.

First, the user information will be described. The user information is mainly information indicating a state or an attribute of the user. Specific examples of the user information include position information indicating a position or an orientation of the user (for example, a relative position to the display unit 15), line-of-sight information indicating a direction of a line of sight, human body information such as a length of an arm or a posture of the user, setting information such as a use language or a degree of skill for an application operation, authority information indicating a set role or authority, etc.

For example, the context information acquisition unit 113 specifies the position information, the line-of-sight information, and the human body information of the user on the basis of the detection information output from the detection unit 19. Also, the context information acquisition unit 113 may use information pre-registered on the basis of the operation of the user as the human body information of the user. Also, the position information, the line-of-sight information, and the human body information of the user are used to specify the range in which the position of the user is the reference point, i.e., the operable range R11 or the browsable range R13 of the user Ua, for example, described above on the basis of FIG. 2.

Also, the context information acquisition unit 113 uses information pre-registered on the basis of the operation of the user as the setting information of the user. Also, the information pre-registered on the basis of the operation of the user may be stored in, for example, the storage unit 17. Also, the context information acquisition unit 113 may specify the use language of the user among the setting information by analyzing, for example, the voice of the user collected by a sound collection device such as a microphone.

Likewise, the context information acquisition unit 113 may use information pre-registered on the basis of the operation of the user as the authority information indicating the role or the authority set for the user. In this case, the context information acquisition unit 113 may acquire the pre-registered authority information by, for example, reading the authority information from the storage unit 17. Also, the context information acquisition unit 113 may acquire the pre-registered information such as information indicating the authority set for the user, for example, using a system call provided by an OS of the information processing device 10. Also, as another example, the context information acquisition unit 113 may read the information stored in a predetermined storage region (for example, the storage unit 17) from the storage region. Also, examples of the role or the authority set for the user include an editor having the authority to edit information, a browser having only the authority to browse information, a manager having manager authority, etc. Also, it is only necessary for the context information acquisition unit 113 to identify a detected user by applying technology for identifying the user such as, for example, face recognition technology and specify setting information corresponding to the user according to an identification result.

The above-described setting information or authority information is used to specify the user serving as a presentation target of each display object under, for example, a situation in which the display object is presented to a plurality of users. Also, an example of an operation using the setting information or the authority information will be separately described below.

Next, the device information will be described. The device information is information indicating a type or a characteristic of the information processing device 10 or the input/output device of the information processing device 10. Specific examples of the device information include a type of device, an attribute information of the device, a form of use of the device, position information indicating a position or an orientation of the device, and environmental information indicating that a state of an environment in which the device is used.

A type of device is a type of device corresponding to an interface with the user Ua such as the operation unit 13 or the display unit 15. The type of the operation unit 13 is information indicating a type of input device as the operation unit 13 such as, for example, a touch panel, a mouse, or a keyboard. Likewise, the type of the display unit 15 is information indicating a type of display device as the display unit 15 such as, for example, a projector or a tabletop display.

Also, the attribute information of the device indicates a characteristic of the device such as a size of the device. For example, the size of the display region of the display unit 15 (in other words, a screen size) and the like are included as the attribute information of the device. For example, if the operation unit 13 is a touch panel, a range in which the touch panel is provided corresponds to a range in which the information processing device 10 can receive an operation from the user. Of course, if the touch panel is provided in the display region of the display unit 15, it is needless to say that the size of the display region corresponds to the range in which the information processing device 10 can receive the operation from the user.

Also, the form of use of the device is information indicating how the device is used by the user and a method of setting the operable range R11 or the browsable range R13 differs according to a different of the form of use.

As a specific example, if the operation unit 13 is constituted of the touch panel, an example in which the user inputs information through a touch operation is shown as the form of use of the device. In this case, because a region in which the touch panel is provided, i.e., the display region R15 of the display unit 15, corresponds to a range in which the operation of the user can be received, the display region R15 corresponds to the operable range R11 of the device.

Also, as another example, if the operation unit 13 is constituted of a sound collection device such as a microphone, an example in which the user inputs information through a voice input is shown as the form of use of the device. In this case, a range in which the operation unit 13 constituted of the sound collection device can receive voice corresponds to a range in which the operation of the user can be received, i.e., the operable range R11 of the device. Also, the range in which the operation unit 13 constituted of the sound collection device can collect the voice may be defined by, for example, sound collection performance (a distance or a range in which the sound can be collected) registered as the position information of the operation unit 13 or the attribute information of the operation unit 13.

Also, as another embodiment, if the user inputs information to the information processing device 10 through a so-called gesture input, the operation unit 13 may be constituted of, for example, an imaging device for imaging a user. Of course, in this case, an example in which the user inputs information through the gesture input is shown as the form of use of the device. Also, in this case, the range in which the imaging device can capture the image corresponds to the range in which the operation of the user can be received, i.e., the operable range R11 of the device. Also, the range in which the operation unit 13 constituted of the imaging device can capture the image may be defined by, for example, imaging performance (for example, an angle of view or magnification power) registered as the position information of the operation unit 13 or the attribute information of the operation unit 13.

Also, it is only necessary for the context information acquisition unit 113 to acquire the type of device, the attribute information, and the information indicating the form of use using, for example, the system call provided by the OS of the information processing device 10. Also, as another example, the context information acquisition unit 113 may read the information stored in a predetermined storage region (for example, the storage unit 17) from the storage region.

The position information indicating the position or the orientation of the device is, for example, information indicating a position or an orientation of the information processing device 10 or a device corresponding to an interface with the user Ua such as the operation unit 13 or the display unit 15. If the information processing device 10 is constituted of a portable terminal such as a tablet terminal or if the operation unit 13 is constituted of a portable medium such as a mouse or a keyboard, the position information is particularly used to specify the position or the orientation of the information processing device 10 or the operation unit 13.

Also, it is only necessary for the context information acquisition unit 113 to acquire the position information of the device from, for example, various sensors such as the acceleration sensor and the angular speed sensor provided in the device. Also, as another example, the context information acquisition unit 113 may acquire the position information of the device from an external device. As a specific example, the context information acquisition unit 113 may calculate the position information of the device by analyzing the image captured by the imaging unit provided in the external device. Of course, a component for acquiring the position information or a method of acquiring the position information is not particularly limited as long as the position information of the device can be acquired.

The environmental information is, for example, information indicating a state of an environment in which the device is used such as brightness around a device such as the information processing device 10, the operation unit 13, or the display unit 15. Also, it is needless to say that the environmental information can be acquired using, for example, various types of sensors. As a specific example, the brightness around the information processing device 10 can be detected by, for example, an illuminance sensor.

Next, the task information will be described. The task information includes information about an operation state of a task (in execution or scheduled to be executed) serving as an execution target, for example, according to an operation of an application, an attribute of the task, and a display object associated with each task.

Also, the attribute of the task corresponds to, for example, control information set according to assumed work of the task. As a specific example, if the user is permitted to edit (update) the task, the task corresponds to a task in which work according to edition by the user is assumed. Also, as another example, if the user is permitted to only browse the task, the task corresponds to a task in which work for the user to only browse information is assumed.

Also, the context information acquisition unit 113 may acquire information indicating the operation state of the task or the attribute of the task from the process execution unit 111 as, for example, information of an application corresponding to the task. Also, as another example, the context information acquisition unit 113 may acquire information indicating the operation state of the task or the attribute of the task using the system call provided by the OS of the information processing device 10.

Also, the context information acquisition unit 113 may acquire the position information indicating the position or the orientation of the display object in the display unit 15 as information of the display object associated with each task from the display control unit 117 to be described below.

Also, the context information acquisition unit 113 may acquire information indicating the state of each display object as information of the display object from the display control unit 117. The "information indicating the state of the display object" corresponds to, for example, information indicating whether the display object is in an active state.

Also, the active state corresponds to, for example, a state in which the task associated with the display object is in operation, a state in which an input of the display object is received, a state in which the display object is a processing target, or the like. In other words, the active state corresponds to a state in which the display object is dynamic or activated.

On the other hand, a non-active state, i.e., an inactive state, corresponds to a state in which the corresponding display object is a static state or a non-activation state. Specifically, the inactive state corresponds to a state in which the task associated with the display object is stopped, a state in which the display objects does not receive the input, a state in which the display object is not a processing target, or the like.

As described above, the context information acquisition unit 113 acquires the user information, the device information, and the task information and outputs the acquired user information, device information, and task information to the calculation unit 115. Also, the context information acquisition unit 113 may output the acquired user information, device information, and task information to the calculation unit 115 via the storage unit 17. In this case, for example, the context information acquisition unit 113 causes the storage unit 17 to store the acquired user information, device information, and task information. It is only necessary for the calculation unit 115 to read the user information, the device information, and the task information stored in the storage unit 17 from the storage unit 17.

Also, the timing at which the context information acquisition unit 113 acquires the context information (i.e., the user information, the device information, and the task information) or the timing at which the context information acquisition unit 113 outputs the context information to the calculation unit 115 is not particularly limited. For example, the context information acquisition unit 113 may acquire the context information in real time. Also, as another example, the context information acquisition unit 113 may acquire the context information for each predetermined timing. Also, as another example, if a predetermined process is executed, the context information acquisition unit 113 may acquire the context information in conjunction with the execution of a process. The same is true for the output of various types of control information to the calculation unit 115. Also, the timing at which the context information acquisition unit 113 acquires the context information and the timing at which the context information acquisition unit 113 outputs the context information !to the calculation unit 115 may not necessarily synchronized.

The calculation unit 115 acquires the user information, the device information, and the task information (i.e., the context information) from the context information acquisition unit 113.

The calculation unit 115 specifies the range in which the user Ua is a reference point, i.e., the operable range R11 and the browsable range R13 of the user Ua, on the basis of the acquired user information.

As a specific example, the calculation unit 115 specifies a range in which the hand of the user Ua reaches (in other words, a movable range of the hand) as the operable range R11 of the user Ua on the basis of the position information of the user Ua (i.e., the position or the orientation of the user Ua) and the human body information of the user (for example, a length of the hand) acquired as the user information. At this time, the calculation unit 115 may correct the operable range R11 of the user Ua (i.e., the range in which the hand of the user Ua reaches) on the basis of the posture of the user Ua acquired as the human body information of the user. Specifically, when the user performs an operation in a standing posture, a movable range of an upper body increases more than when the user performs an operation in a sitting posture. Thus, when the user performs an operation in the standing posture, the operable range R11 tends to increase more than when the user performs an operation in the sitting posture.

Also, the calculation unit 115 specifies the range capable of being placed in a field of view of the user Ua as the browsable range R13 of the user Ua on the bass of the position information of the user Ua as the user information, i.e., a position of the user Ua or an orientation of a human body or a head of the user Ua. Also, at this time, the calculation unit 115 may correct the browsable range R13 of the user Ua (i.e., the range capable of being placed in the field of view of the user Ua) on the basis of information about a line of sight of the user Ua acquired as the user information. Also, the calculation unit 115 may correct the operable range R11 or the browsable range R13 of the user Ua on the basis of the environmental information acquired as the device information. As a specific example, the calculation unit 115 may perform correction so that the operable range R11 or the browsable range R13 of the user Ua is narrowed if it is recognized that a region around the information processing device 10 is dark on the basis of the environmental information.

Also, the calculation unit 115 specifies the operable range R11 and the browsable range R13 of the device on the basis of the type of the display unit 15 or the form of use of the display unit 15 acquired as the device information.

As a specific example, the calculation unit 115 is assumed to recognize that the operation unit 13 is constituted of the touch panel on the basis of the type of device and the form of use of the device. In this case, the calculation unit 115 specifies the display region of the display unit 15 as the operable range R11 of the device and the browsable range R13 of the device.

Also, as another example, the calculation unit 115 is assumed to recognize that the operation unit 13 is constituted of a sound collection device such as a microphone on the basis of the type of device and the form of use of the device and the user inputs information through voice recognition. In this case, the calculation unit 115 specifies the operable range R11 of the device on the basis of the position information of the operation unit 13 or the attribute information of the operation unit 13 (for example, sound collection performance) acquired as the device information. Also, in this case, the operation unit 13 and the display unit 15 are constituted of separate devices. Thus, the calculation unit 115 specifies the display region of the display unit 15 as the browsable range R13 of the device.

Also, hereinafter, the operation of the calculation unit 115 will be described in an example in which the operation unit 13 is constituted of the touch panel, i.e., in which the display region R15 of the display unit 15 corresponds to both the operable range R11 and the browsable range R13 of the device.

The calculation unit 115 allocates the display object associated with the task to a region in which one of the operable range R11 and the browsable range R13 overlaps the display region R15 on the basis of an attribute of each task acquired as task information.

As a specific example, the attribution of the task is the permission of edition (update) for the user. In this case, the calculation unit 115 allocates the display object associated with the task to a region in which the operable range R11 of the user and the display region R15 overlap.

Also, as another example, the attribution of the task is the permission of only browsing for the user. In this case, the calculation unit 115 allocates the display object associated with the task to a region in which the browsable range R13 of the user overlaps the display region R15. Also, at this time, the calculation unit 115 may allocate the display object to a region in which the browsable range R13 of the user overlap the display region R15 and which is outside the operable range R11 of the user.

Also, the calculation unit 115 may specify a region to which the display object associated with the task is allocated on the basis of an operation state of each task acquired as the task information.

As a specific example, the calculation unit 115 may allocate the display object associated with a task in operation to a region in which one of the operable range R11 and the browsable range R13 of the user overlaps the display region R15. Also, at this time, the calculation unit 115 may allocate the display object associated with a stopped task to a region in which the operable range R11 of the user does not overlap the browsable range R13 in the display region R15.

Likewise, the calculation unit 115 may specify a region to which the display object associated with the task is allocated on the basis of information indicating a state of the display object associated with each task acquired as the task information.

As a specific example, the calculation unit 115 may allocate the display object of the active state to a region in which one of the operable range R11 and the browsable range R13 of the user overlaps the display region R15. Also, at this time, the calculation unit 115 may allocate the display object of the inactive state to a region in which the operable range R11 and the browsable range R13 of the user do not overlap in the display region R15.

Also, the calculation unit 115 may determine whether it is possible to newly allocate the display object according to a positional relationship between the display object displayed in the display region R15 and at least one of the operable range R11 and the browsable range R13 of the user. For example, if a large number of display objects are already allocated within the operable range R11 of the user, it may be difficult to allocate a newly generated display object according to execution of a new task. In this case, the allocation of the newly generated display object to the operable range R11 of the user may be limited. As a specific example, the calculation unit 115 may control only partial information to be presented as in the allocation of a notification or the like for the newly generated display object. Also, in this case, the calculation unit 115 receives, for example, the selection of the notification and the corresponding display object may be allocated to the operable range R11 of the user.

Also, as another example, the calculation unit 115 may assign priority between the display objects and determine the display object to be allocated to the operable range R11 of the user on the basis of the priority. As a specific example, the calculation unit 115 may preferentially allocate the display object of the active state to the operable range R11 of the user.

Also, the calculation unit 115 may specify the region to which the display object associated with the task is allocated by combining the attribute of the task and the authority information of the user acquired as the user information.

For example, if the attribute of the task is the permission of edition (update) for only the manager, the calculation unit 115 may allocate the display object corresponding to the task to the region in which the operable range R11 of the user overlaps the display region R15 only when the user is the manager. Also, if the user is not the manager, the calculation unit 115 may allocate the display object corresponding to the task to the region in which the browsable range R13 of the user overlaps the display region R15.

Also, as another example, the calculation unit 115 may specify the region to which the display object associated with the task is allocated by combining information about the display object acquired as the task information and setting information of the user acquired as the user information. Also, the setting information corresponding to the detected user can be specified on the basis of an identification result by identifying the user on the basis of technology for identifying the user as in, for example, face recognition technology or the like, as described above. Of course, it is needless to say that it is only necessary to extract the setting information of the user when the user is recognizable in advance as in the case in which only a login user serves as a target or the like.

For example, if a language of text information presented to the display object matches a use language of the user, the calculation unit 115 may allocate the display object to the region in which the browsable range R13 of the user overlaps the display region R15. Also, at this time, the calculation unit 115 may allocate the display object to a region which does not overlap the browsable range R13 of the user in the display region R15 if the language of the text information presented to the display object does not match the use language of the user.

Also, the operation unit 13 may enable the user to input information regardless of the operable range R11 of the user as in the case in which the operation unit 13 is constituted of a sound collection device such as a microphone and acquires an input of the user through voice recognition or the like. In this case, it is only necessary for the calculation unit 115 to specify a region to which the display object associated with each task is allocated on the basis of the browsable range R13 of the user and the browsable range R13 of the device.

Also, the calculation unit 115 may specify the orientation of the display object with respect to the display unit 15 on the basis of the position information of the user acquired as the user information, i.e., the orientation of the user with respect to the display unit 15. As a specific example, the calculation unit 115 may specify the orientation of the display object with respect to the display unit 15 so that the top/bottom direction is correct with respect to the user on the basis of the orientation of the user with respect to the display unit 15.

As described above, the calculation unit 115 specifies the operable range R11 and the browsable range R13 of the user and the operable range R11 and the browsable range R13 of the device. The calculation unit 115 specifies a partial region of the display region R15 (i.e., the browsable range R13 of the device) to which the display object associated with each task is allocated on the basis of each specified region and the task information. Also, the calculation unit 115 may specify the orientation of the display object with respect to the display unit 15 on the basis of the position information of the user acquired as the user information, i.e., the orientation of the user with respect to the display unit 15.

The calculation unit 115 outputs control information indicating a correspondence relationship between each display object and a partial region of the display region R15 to which the display object is allocated or the orientation of the display object to the display control unit 117.

The display control unit 117 is a component for controlling the display of the display object on the display unit 15.

Specifically, the display control unit 117 specifies the display object serving as a target of display control according to an operation target (a display object) specified on the basis of an input of the user and processing content and controls the display of the specified display object. Also, an example of control by the display control unit 117 includes control of the display and non-display of the display object and a display position or orientation, and a display form (e.g., a color or a size) of the display object, etc.

Also, the display control unit 117 may acquire an execution result of an application from the process execution unit 111 and present a display result to the display object (e.g., a window) associated with the application. At this time, the display control unit 117 may newly generate the display object and associate the application with the display object if the display object corresponding to the application is not displayed on the display unit 15.

Also, the display control unit 117 may associate the display object with each task which operates on the basis of the execution of the application. As a specific example, the display control unit 117 may associate the display object with each of a task for enabling the application to receive an input of the user and a task for enabling the application to display the execution result according to execution of the application.

Also, the display control unit 117 may control the state of the display object on the basis of a result of display control of each display object or an execution result of a task associated with the display object (in other words, an application or content). Also, an example of the state of the display object includes the above-described active state or inactive state. As a specific example, the display control unit 117 may cause the display object associated with the task in operation to transition to the active state. Also, the display control unit 117 may cause the display object associated with the stopped task to transition to the inactive state.

Also, the display control unit 117 may cause the storage unit 17 to retain information for controlling the display of the display object or information for managing the state of the display object.

Also, the display control unit 117 outputs the position information of the display object displayed on the display unit 15 in the display unit 15 or the control information indicating the state of the display object as information about the display object to the context information acquisition unit 113. Of course, it is needless to say that the context information acquisition unit 113 may directly acquire the information about the display object from the display control unit 117 or indirectly acquire the information about the display object via the storage unit 17.

Also, the display control unit 117 acquires control information indicating the correspondence relationship between each display object and a partial region of the display region R15 to which the display object is allocated or the orientation of the display object from the calculation unit 115.

The display control unit 117 controls the display of the display object on the display unit 15 on the basis of the control information acquired from the calculation unit 115.

As a specific example, the display control unit 117 causes a display object v11 associated with a task for receiving an operation of the user to be displayed within a range in which the operable range R11 of the user overlaps the display region R15 as illustrated in FIG. 2. Also, at this time, the display control unit 117 may control the orientation of the display object v11 so that the top/bottom direction corrects for the user on the basis of the control information acquired from the calculation unit 115.

Also, the display control unit 117 causes a display object v13 associated with a task for only presenting information to the user to be displayed within a range in which the browsable range R13 of the user overlaps the display region R15 as illustrated in FIG. 2. At this time, the information processing device 10 may cause the display object v13 to be displayed in a region which is within a range in which the browsable range R13 of the user overlaps the display region R15 and which is outside the operable range R11 of the user. Also, at this time, the display control unit 117 may control the orientation of the display object v13 so that the top/ bottom direction is correct with respect to the user on the basis of the control information acquired from the calculation unit 115.

Also, the timing at which each of the context information acquisition unit 113, the calculation unit 115, and the display control unit 117 operates is not particularly limited and it is only necessary to appropriately set the timing according to a situation or an operation to which the information processing device 10 is applied. As a specific example, components of the context information acquisition unit 113, the calculation unit 115, and the display control unit 117 may operate in real time or operate at each predetermined timing. Also, as another example, if a predetermined process is executed, the components of the context information acquisition unit 113, the calculation unit 115, and the display control unit 117 may operate in conjunction with the process. Also, the components of the context information acquisition unit 113, the calculation unit 115, and the display control unit 117 need not necessarily synchronously operate and the components may operate at different timings.

Also, the above is only an example and a type of information acquired as context information or content of control by the information processing device 10 is not necessarily limited to the above-described example as long as the display of the display object on the display unit 15 can be controlled according to a state of the user or device.

For example, the information processing device 10 may detect the operation of the user and control the display form of the display object according to the detected operation. As a specific example, the information processing device 10 may control the display form of the display object so that the display size of the display object increases by assuming that it is difficult for the user to perform a fine operation if the user performs an operation while moving.

Also, the information processing device 10 may acquire pre-registered information indicating visual power of the user as the human body information of the user and correct the breadth of the browsable range R13 of the user according to visual power indicated by the acquired information.

Also, the information processing device 10 may control content of information presented as the display object according to a degree of skill for an application operation pre-registered as setting information. As a specific example, the information processing device 10 may present an interface capable of being more easily operated such as, for example, an operation interface in which automatic setting is mainly performed, as the display object for a user with a low degree of skill. Also, the information processing device 10 may present an interface in which finer setting is possible as the display object for a user with a high degree of skill.

An example of a functional configuration of the information processing device 10 according to the present embodiment has been described above with reference to FIG. 3.

3. Process

Figure 4:
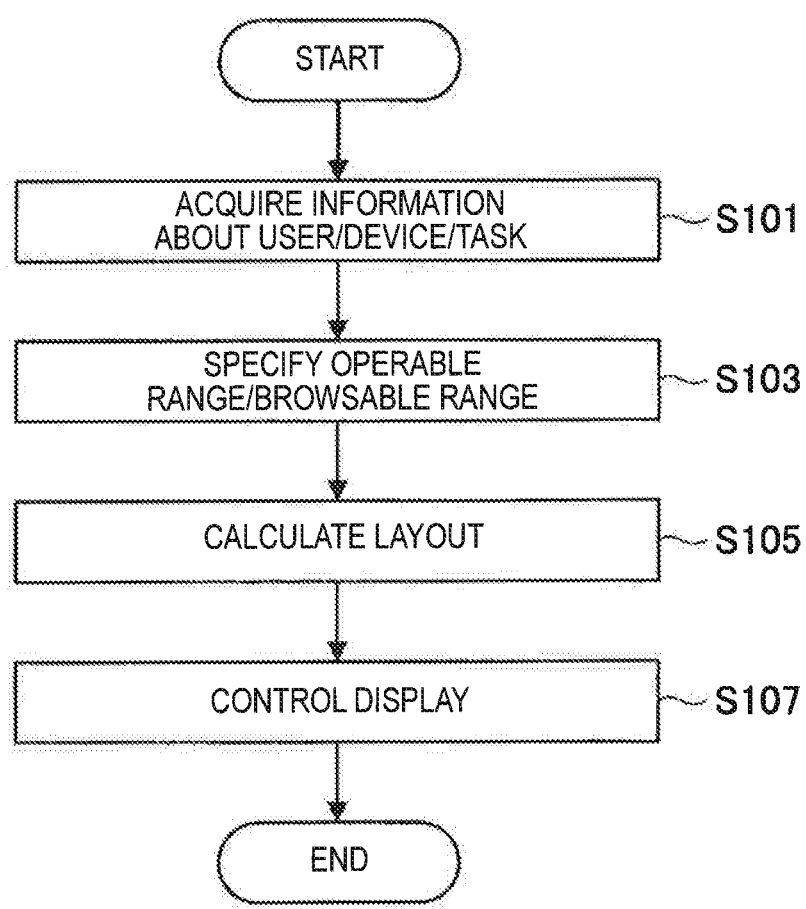
FIG. 4 is a flowchart illustrating an example of a flow of a series of operations of the information processing device according to the embodiment.

Next, an example of a flow of a series of operations of the information processing device 10 according to the present embodiment will be described with reference to FIG. 4 by particularly focusing on an operation in which the information processing device 10 controls the display of the display object according to a result of recognizing a relative position of the user to the display unit 15. FIG. 4 is a flowchart illustrating the flow of the series of operations of the information processing device 10 according to the present embodiment.

(Step S101)

The context information acquisition unit 113 acquires context information for the calculation unit 115 to specify the relative position of the user Ua to the display unit 15 or a range in which the position of the user Ua is a reference point and control a display position or an orientation with a display object. The context information mainly includes user information, device information, and task information.

The context information acquisition unit 113 acquires information which dynamically changes according to a situation such as detection information for specifying the relative position of the user Ua to the display unit 15 among the above-described context information from a so-called detection device such as the detection unit 19. Also, the detection unit 19 may be constituted of various types of sensors such as a distance sensor, a proximity sensor, a human detection sensor, and an infrared sensor or a device capable of acquiring information for detecting a detection target at a desired timing such as an imaging unit.

Also, the context information acquisition unit 113 acquires static information such as, for example, information pre-registered on the basis of an operation of the user, among the above-described context information using, for example, a system call provided by the OS of the information processing device 10. Also, as another example, the context information acquisition unit 113 may read the static information stored in a predetermined storage region (e.g., the storage unit 17) from the storage region.

Also, the context information acquisition unit 113 may acquire position information indicating a position or an orientation of a display object in the display unit 15 as information about the display object associated with each task. Also, the context information acquisition unit 113 may acquire information indicating a state of each display object as information about the display object. Also, it is only necessary for the context information acquisition unit 113 to acquire information about the display object from, for example, the display control unit 117.

As described above, the context information acquisition unit 113 acquires the user information, the device information, and the task information (i.e., the context information) and outputs the acquired context information to the calculation unit 115. Also, the context information acquisition unit 113 may output the acquired context information to the calculation unit 115 via the storage unit 17. In this case, for example, the context information acquisition unit 113 causes the storage unit 17 to store the acquired context information. It is only necessary for the calculation unit 115 to read the context information stored in the storage unit 17 from the storage unit 17.

(Step S103)

The calculation unit 115 acquires the user information, the device information, and the task information (i.e., the context information) from the context information acquisition unit 113.

The calculation unit 115 specifies a range in which the user Ua is the reference point, i.e., the operable range R11 and the browsable range R13 of the user Ua, on the basis of the acquired user information.

As a specific example, the calculation unit 115 specifies a range in which the hand of the user Ua reaches (in other words, a movable range of the hand) as the operable range R11 of the user Ua on the basis of the position information of the user Ua (i.e., the position or the orientation of the user Ua) and the human body information of the user (for example, a length of a hand) acquired as the user information.

Also, the calculation unit 115 specifies the range capable of being placed in a field of view of the user Ua as the browsable range R13 of the user Ua on the bass of the position information of the user Ua as the user information, i.e., a position of the user Ua or an orientation of a human body or a head of the user Ua.

Also, the calculation unit 115 specifies the operable range R11 and the browsable range R13 of the device on the basis of the type of the display unit 15 or the form of use of the display unit 15 acquired as the device information.

As a specific example, the calculation unit 115 is assumed to recognize that the operation unit 13 is constituted of the touch panel on the basis of the type of device and the form of use of the device. In this case, the calculation unit 115 specifies the display region R15 of the display unit 15 as the operable range R11 of the device and the browsable range R13 of the device.

Also, as another example, the calculation unit 115 is assumed to recognize that the operation unit 13 is constituted of a sound collection device such as a microphone on the basis of the type of device and the form of use of the device and the user inputs information through voice recognition. In this case, the calculation unit 115 specifies the operable range R11 of the device on the basis of the position information of the operation unit 13 or the attribute information of the operation unit 13 (for example, sound collection performance) acquired as the device information. Also, in this case, the operation unit 13 and the display unit 15 are constituted of separate devices. Thus, the calculation unit 115 specifies the display region of the display unit 15 as the browsable range R13 of the device.

Also, hereinafter, an example in which the operation unit 13 is constituted of the touch panel, i.e., in which the display region R15 corresponds to both the operable range R11 and the browsable range R13 of the device will be described.

(Step S105)

The calculation unit 115 allocates the display object associated with the task to a region in which one of the operable range R11 and the browsable range R13 of the user overlaps the display region R15 on the basis of an attribute of each task acquired as task information.

As a specific example, the attribute of the task is the permission of edition (update) for the user. In this case, the calculation unit 115 allocates the display object associated with the task to a region in which the operable range R11 of the user overlaps the display region R15.

Also, the calculation unit 115 may specify a region to which the display object associated with the task is allocated on the basis of an operation state of each task acquired as the task information.

As a specific example, the calculation unit 115 may allocate a display object associated with a task in operation to a region in which one of the operable range R11 and the browsable range R13 of the user overlaps the display region R15.

Likewise, the calculation unit 115 may specify a region to which the display object associated with the task is allocated on the basis of information indicating a state of the display object associated with each task acquired as the task information.

Also, the calculation unit 115 may specify the region to which the display object associated with the task is allocated by combining the attribute of the task and the authority information of the user acquired as the user information.

Also, as another example, the calculation unit 115 may specify the region to which the display object associated with the task is allocated by combining information about the display object acquired as the task information and setting information of the user acquired as the user information.

Also, the calculation unit 115 may specify the orientation of the display object with respect to the display unit 15 on the basis of the position information of the user acquired as the user information, i.e., the orientation of the user with respect to the display unit 15.

As described above, the calculation unit 115 specifies the operable range R11 and the browsable range R13 of the user and the operable range R11 and the browsable range R13 of the device. The calculation unit 115 specifies a partial region of the display region R15 (i.e., the browsable range R13 of the device) to which the display object associated with each task is allocated on the basis of each specified region and the task information. Also, the calculation unit 115 may specify the orientation of the display object with respect to the display unit 15 on the basis of the position information of the user acquired as the user information, i.e., the orientation of the user with respect to the display unit 15.

The calculation unit 115 outputs control information indicating a correspondence relationship between each display object and a partial region of the display region R15 to which the display object is allocated or the orientation of the display object to the display control unit 117.

(Step S107)

Also, the display control unit 117 acquires control information indicating the correspondence relationship between each display object and a partial region of the display region R15 to which the display object is allocated or the orientation of the display object from the calculation unit 115.

The display control unit 117 controls the display of the display object on the display unit 15 on the basis of the control information acquired from the calculation unit 115.

As a specific example, the display control unit 117 causes a display object v11 associated with a task for receiving an operation of the user to be displayed within a range in which the operable range R11 of the user overlaps the display region R15 as illustrated in FIG. 2. Also, at this time, the display control unit 117 may control the orientation of the display object v11 so that the top/bottom direction corrects for the user on the basis of the acquired control information.

Also, the display control unit 117 causes a display object v13 associated with a task for only presenting information to the user to be displayed within a range in which the browsable range R13 of the user overlaps the display region R15 as illustrated in FIG. 2. At this time, the information processing device 10 may cause the display object v13 to be displayed in a region which is within a range in which the browsable range R13 of the user overlaps the display region R15 and which is outside the operable range R11 of the user. Also, at this time, the display control unit 117 may control the orientation of the display object v13 so that the top/bottom direction is correct with respect to the user on the basis of the acquired control information.

An example of a flow of a series of operations of the information processing device 10 according to the present embodiment has been described above with reference to FIG. 4 by particularly focusing on an operation in which the information processing device 10 controls the display of the display object according to a result of recognizing a relative position of the user to the display unit 15.

4. Examples

Next, the examples of the information processing device 10 according to the present embodiment will be described.

4.1. Example 1: Control Example in Case of Plurality of Users

First, an example of control by the information processing device 10 when a plurality of users are detected will be described with reference to FIGS. 5 to 8 as example 1. FIGS. 5 to 8 are explanatory diagrams illustrating examples of control by the information processing device 10 according to example 1.

Also, in the examples illustrated in FIGS. 5 to 8, as in the above-described examples illustrated in FIGS. 1 and 2, the information processing device 10 is constituted of a so-called tabletop display so that the display unit 15 is arranged along an xy plane (a horizontal plane). Also, FIGS. 5 to 8 illustrate schematic configurations when the information processing device 10 is viewed from an upper side of the z-direction (a side facing the display unit 15, i.e., above the display unit 15). Also, in the following description, in FIGS. 5 to 8, the lower side of the drawing is a + side of the y-direction, the upper side of the drawing is a − side of the y-direction, the right of the drawing is a + side of the x-direction, and the left of the drawing is a − side of the x-direction. Also, in the examples illustrated in FIGS. 5 to 8, as in examples illustrated in FIGS. 1 and 2, the display region of the display unit 15 is assumed to be constituted of a touch panel.

Figure 5:
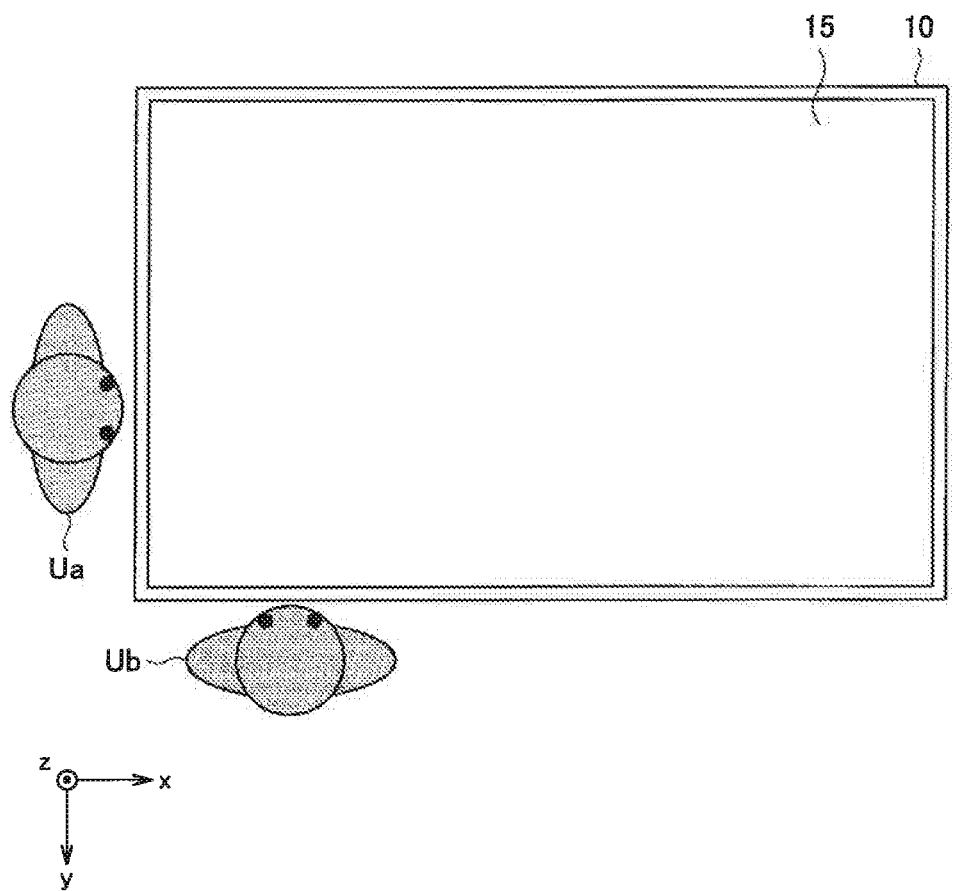
FIG. 5 is an explanatory diagram illustrating an example of control by the information processing device according to example 1.

In the present description, as illustrated in FIG. 5, users Ua and Ub will be described as performing an operation on the display region R15 of the display unit 15 constituted of the touch panel while referring to the display unit 15. Also, as illustrated in FIG. 5, the user Ua is placed at the − side of an x-direction for the display unit 15 and directed to the side of the display unit 15, i.e., the + side of the x-direction. Also, the user Ub is placed at the + side of a y-direction for the display unit 15 and directed to the side of the display unit 15, i.e., the − side of the y-direction.

In the example illustrated in FIG. 5, the information processing device 10 acquires user information for each of the users Ua and Ub when context information is acquired. Also, at this time, the information processing device 10 acquires a relative position (i.e., a position or an orientation) of each of the users Ua and Ub to the display unit 15 as user information. Also, the information processing device 10 may identify each of the users Ua and Ub according to technology for identifying the user such as face recognition technology.

The information processing device 10 specifies the operable range R11 or the browsable range R13 of the user for each of the users Ua and Ub on the basis of user information about each of the users Ua and Ub.

Figure 6:
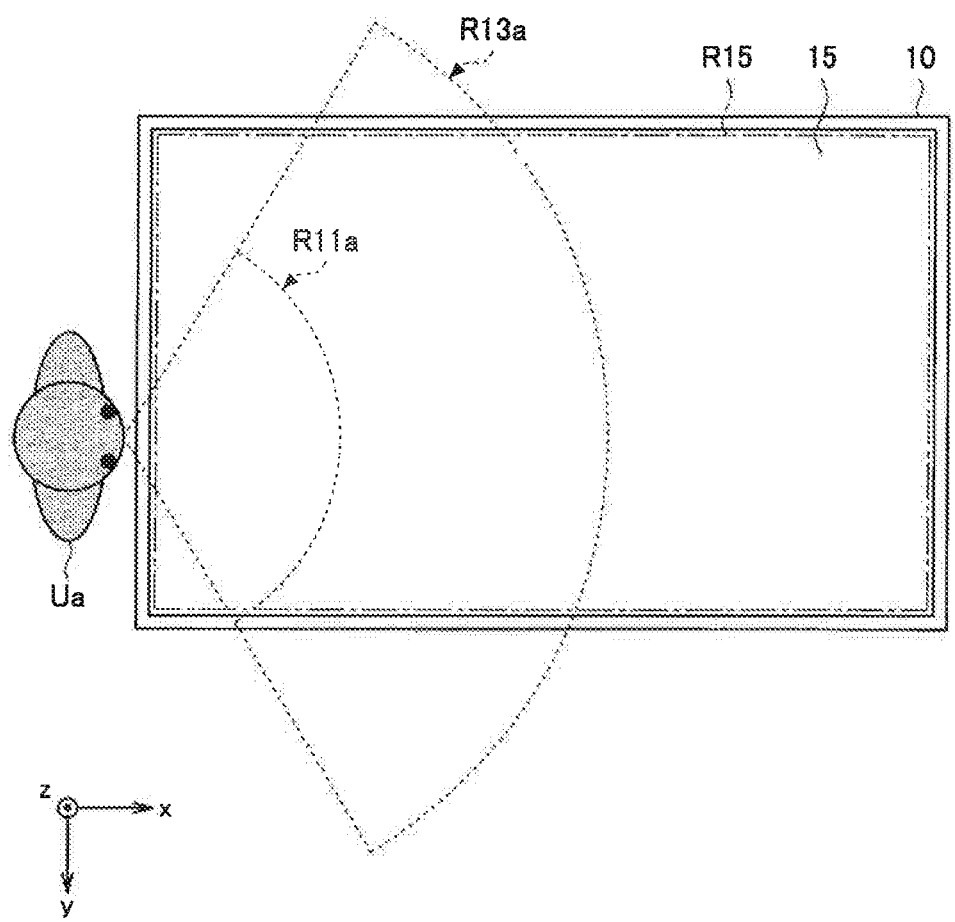
FIG. 6 is an explanatory diagram illustrating an example of control by the information processing device according to example 1.

For example, FIG. 6 illustrates the operable range R11 and the browsable range R13 of the user Ua in the example illustrated in FIG. 5. Also, reference sign R11a illustrated in FIG. 6 denotes the operable range R11 of the user Ua. Likewise, reference sign R13a denotes the operable range R13 of the user Ua. Also, reference sign R15 denotes a display region of the display unit 15. Also, as described above, the display region R15 is constituted of the touch panel. Thus, the display region R15 becomes an operable range R11 of the device and a browsable range R13 of the device.

As illustrated in FIG. 6, the information processing device 10 specifies a range in which the user Ua is a reference point, i.e., the operable range R11a and the browsable range R13a of the user Ua, on the basis of the user information of the user Ua acquired as the context information.

Also, the information processing device 10 specifies the display region R15 (i.e., the operable range R11 and the browsable range R13 of the device) on the basis of the device information of the display unit 15 acquired as the context information.

Figure 7:
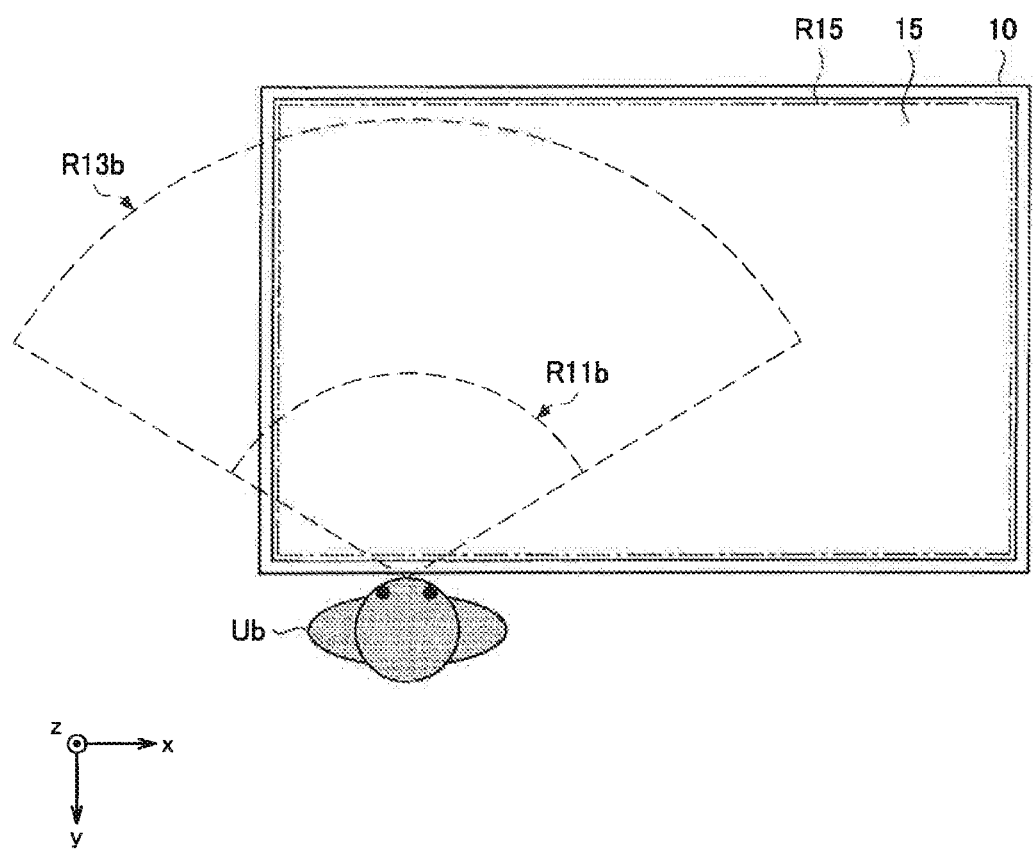
FIG. 7 is an explanatory diagram illustrating an example of control by the information processing device according to example 1.

Also, FIG. 7 illustrates the operable range R11 and the browsable range R13 of the user Ub in the example illustrated in FIG. 5. Also, reference sign R11a illustrated in FIG. 7 denotes the operable range R11 of the user Ub. Likewise, reference sign R13b denotes the operable range R13 of the user Ub. Also, reference sign R15 denotes a display region of the display unit 15 as in FIG. 6.

As illustrated in FIG. 7, the information processing device 10 specifies a range in which the user Ub is a reference point, i.e., the operable range R11b and the browsable range R13b of the user Ub, on the basis of the user information of the user Ub acquired as the context information.

As described above, the information processing device 10 specifies the operable range R11a and the browsable range R13a of the user Ua, the operable range R11b and the browsable range R13b of the user Ub, and the display region R15 on the basis of the acquired user information and device information. The information processing device 10 allocates a display object associated with the task on the basis of an attribute of each task acquired as the task information to one of partial regions specified on the basis of the specified ranges R11a, R11b, R13a, and R13b and display region R15.

Figure 8:
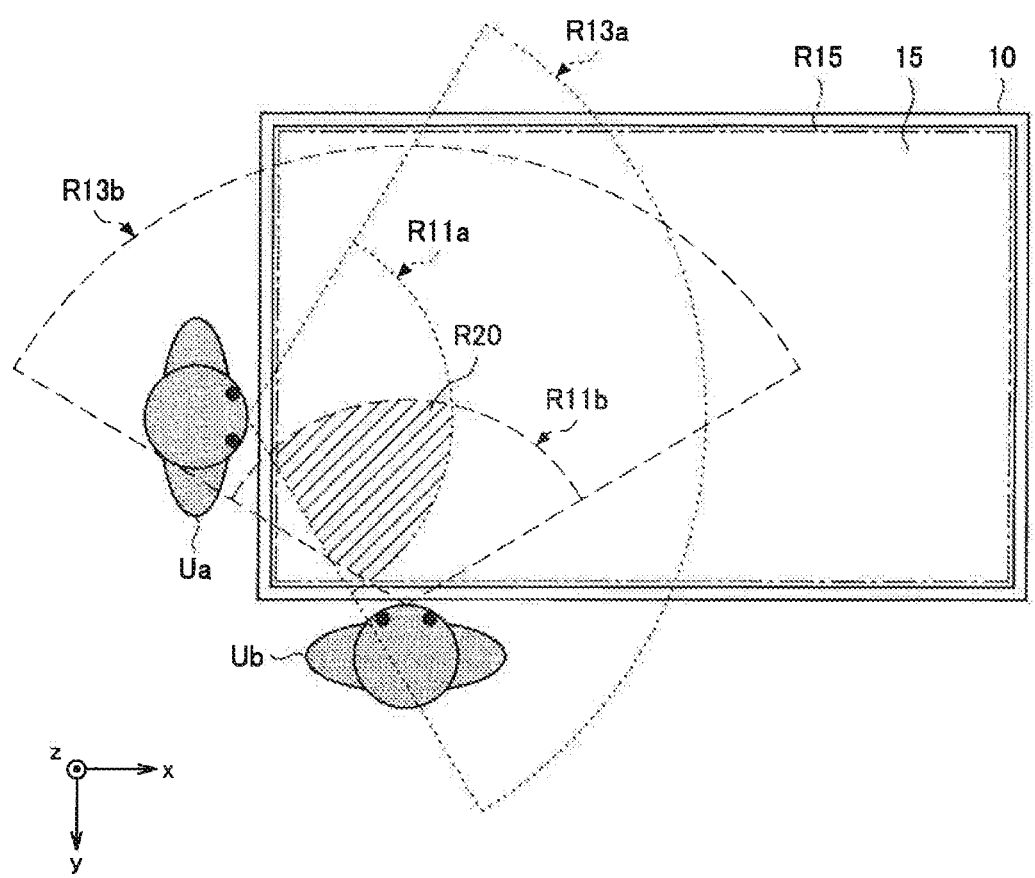
FIG. 8 is an explanatory diagram illustrating an example of control by the information processing device according to example 1.

For example, FIG. 8 is a diagram illustrated to enable the operable range R11a and the browsable range R13a of the user Ua, the operable range R11b and the browsable range R13b of the user Ub, and the display region R15 to be identified for FIG. 5.

In FIG. 8, reference sign R20 denotes a partial region in which the operable range R11a, the operable range R11b, and the display region R15 overlap. That is, the partial region R20 indicates a range in which both the users Ua and Ub can perform an operation in the display region R15.

Thus, the information processing device 10 may allocate a display object corresponding to a task having an attribute capable of being operated by a plurality of users (for example, the users Ua and Ub) to the partial region R20. Also, at this time, the information processing device 10 may adjust an orientation of the display object to be allocated to the partial region R20 to an orientation in which it is easy for both the users Ua and Ub to view the display object on the basis of the orientations of the users Ua and Ub.

Also, as another example, the information processing device 10 may allocate a display object corresponding to a task having an attribute capable of being only operated from the user Ua to a partial region capable of being operated by only the user Ua. Also, the partial region capable of being operated by only the user Ua corresponds to a partial region which does not overlap the operable range R11b of the user Ub in the partial region in which the operable range R11a of the user Ua overlaps the display region R15.

As a specific example, it is assumed that manager authority is set for the user Ua and no manager authority is set for the user Ub. At this time, the information processing device 10 recognizes that the manager authority is set for only the user Ua on the basis of setting information of each of the users Ua and Ub. The information processing device 10 may allocate a display object corresponding to a task having an attribute capable of being only operated from the user for which the manager authority is set to the partial region capable of being operated by only the user Ua having the manager authority. The same is true even when a role of an editor is set for the user Ua, a role of a browser is set for the user Ub, and a display object corresponding to the task having an attribute capable of being operated by only the editor is presented. That is, the information processing device 10 may allocate a display object corresponding to a task having an attribute capable of being operated by only the editor to a partial region capable of being operated by only the user Ua for which the role of the editor is set.

Likewise, the information processing device 10 may allocate, for example, a display object corresponding to a task having an attribute capable of being browsed by a plurality of users (for example, the users Ua and Ub), to a partial region capable of being browsed by both the users Ua and Ub. Also, the partial region capable of being browsed by both the users Ua and Ub corresponds to a partial region in which the browsable range R13a of the user Ua, the browsable range R13b of the user Ub, and the display region R15 overlap.

Also, the information processing device 10 may allocate a display object corresponding to the task having an attribute capable of being browsed by only the user Ua to a partial region capable of being browsed by only the user Ua. Also, the partial region capable of being browsed by only the user Ua corresponds to a partial region which does not overlap the browsable range R13b of the user Ub in a partial region in which the browsable range R13a of the user Ua overlaps the display region R15.

Also, the information processing device 10 may determine a partial region to which the display object is allocated on the basis of the setting information of each of the users Ua and Ub. As a specific example, if use languages of the users Ua and Ub are common, the information processing device 10 may allocate a display object in which information is presented in the common language to a partial region capable of being browsed by both the users Ua and Ub. On the other hand, if the use languages of the users Ua and Ub are different, the information processing device 10 may allocate the display object to a partial region capable of being browsed by only one of the users Ua and Ub according to a language of information presented to the display object.

As described above as example 1, the information processing device 10 may specify the operable range R11 and the browsable range R13 of the user for each of the detected users if a plurality of users are detected. The information processing device 10 may determine a partial region to which the display object corresponding to the task is allocated in a partial region defined on the basis of each specified range according to a characteristic of the task. Through this configuration, the information processing device 10 according to example 1 can present information to each of the plurality of users in a suitable mode under, for example, a situation in which the plurality of users perform cooperative work.

Figure 9:
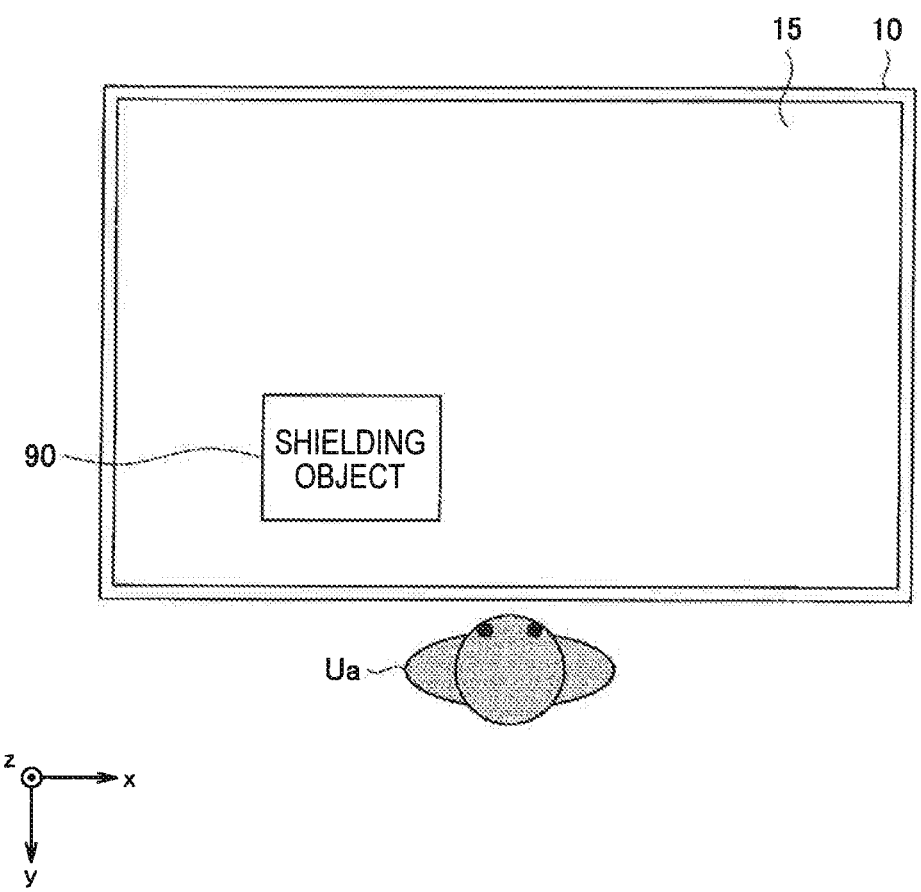
FIG. 9 is an explanatory diagram illustrating an example of control by the information processing device according to example 2.
Figure 10:
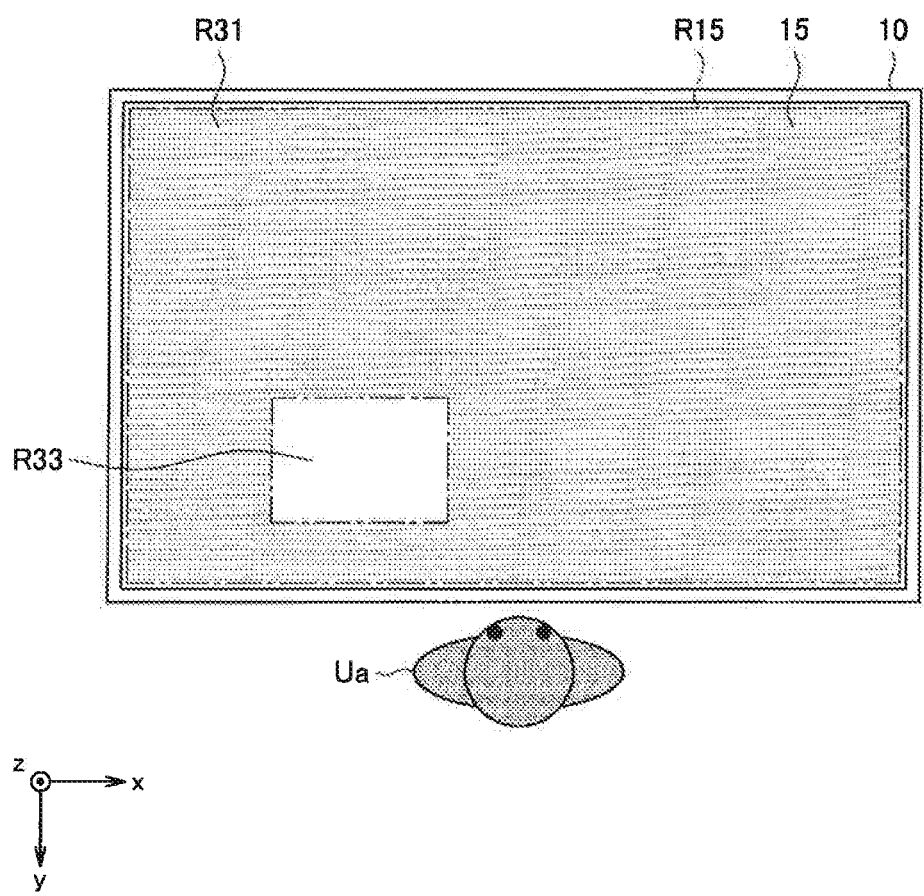
FIG. 10 is an explanatory diagram illustrating an example of control by the information processing device according to example 2.
Figure 11:
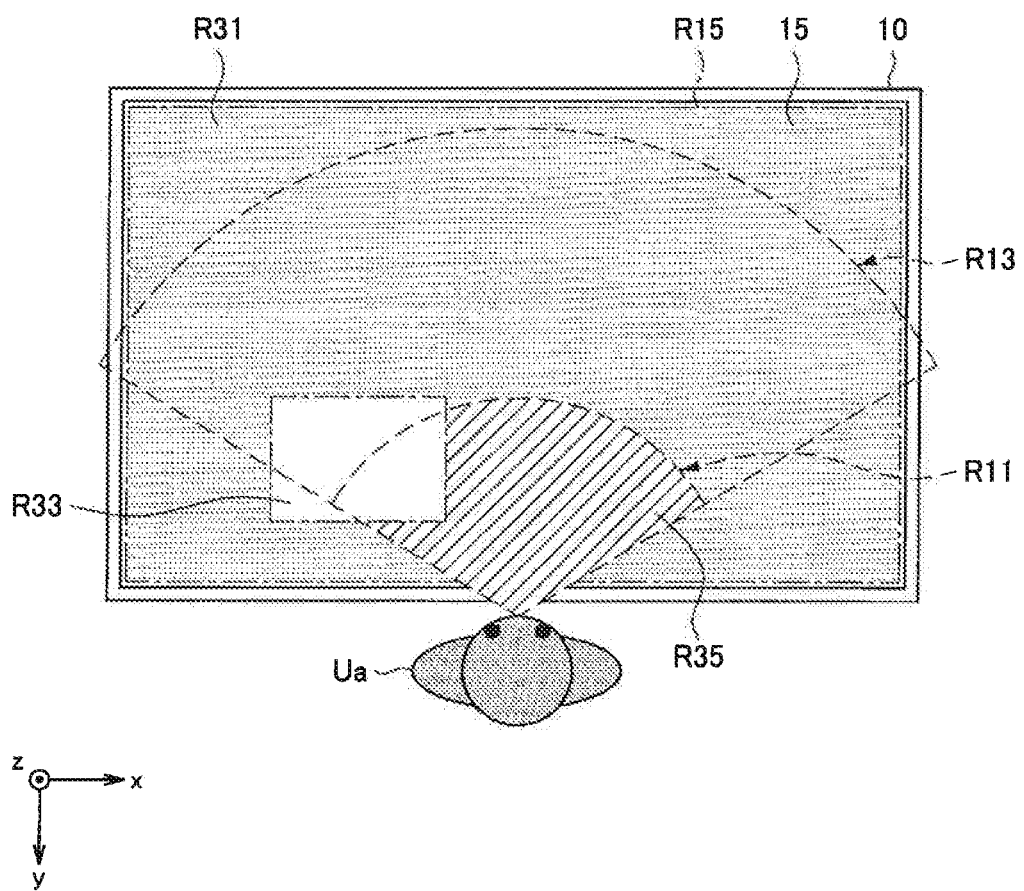
FIG. 11 is an explanatory diagram illustrating an example of control by the information processing device according to example 2.

4.2. Example 2: Example of Method of Specifying Partial Region to which Display Object is Allocated Next, as example 2, an example of control in which the information processing device 10 specifies a partial region to which the display object is allocated will be described with reference to FIGS. 9 to 11. FIGS. 9 to 11 are explanatory diagrams illustrating the example of control by the information processing device 10 according to example 2. In example 2, an example of control in which the information processing device 10 specifies the partial region to which the display object is allocated under a situation in which a physical object (a real object) for shielding a part of the display region R15 is arranged in the display region R15 of the display unit 15 as illustrated in FIG. 9 will be described.

Also, in the examples illustrated in FIGS. 9 to 11, as in the above-described examples illustrated in FIGS. 1 and 2, the information processing device 10 is configured so that the display unit 15 is arranged along an xy plane (a horizontal plane) as in a so-called tabletop display. Also, FIGS. 9 to 11 illustrate schematic configurations when the information processing device 10 is viewed from an upper side of the z-direction (a side facing the display unit 15, i.e., above the display unit 15). Also, in the following description, in FIGS. 9 to 11, the lower side of the drawing is a + side of the y-direction, the upper side of the drawing is a − side of the y-direction, the right of the drawing is a + side of the x-direction, and the left of the drawing is a − side of the x-direction. Also, in the examples illustrated in FIGS. 9 to 11, as in examples illustrated in FIGS. 1 and 2, the display region of the display unit 15 is assumed to be constituted of a touch panel. Also, hereinafter, as illustrated in FIG. 9, a real object which shields a part of the display region arranged in the display region R15 of the display unit 15 may be referred to as a "shielding object 90."

As illustrated in FIG. 9, if the shielding object 90 is arranged in the display region of the display unit 150, the shielding object 90 shields a part of the display region of the display unit 15. Thus, the display object is displayed in a region shielded by the shielding object 90 in the display region R15 of the display unit 15 and therefore there may be a situation in which it is difficult for the user Ua to refer to the display object.

Therefore, the information processing device 10 according to example 2 controls the display of the display object so that the display object is displayed in a region other than the region shielded by the shielding object 90 in the display region R15. Hereinafter, an example of an operation of the information processing device 10 according to example 2 will be described in further detail.

First, the information processing device 10 specifies the region shielded by the shielding object 90 in the display region R15. As a specific example, it is only necessary for the information processing device 10 to specify a region in which the shielding object 90 is arranged in the display region R15 through a sensor capable of detecting a real object arraigned in the display region R15 such as a depth sensor, a pressure sensor, or a proximity sensor. Also, in this case, the region in which the shielding object 90 is arranged in the display region R15 corresponds to the region shielded by the shielding object 90 in the display region R15.

Also, as another example, the information processing device 10 may specify the region in which the shielding object 90 is arranged in the display region R15 by analyzing an image of the display region R15 imaged by the imaging unit. In this case, for example, it is only necessary to provide a configuration in which the imaging unit is provided above the display unit 15 (on an upper side of the z-direction) and the imaging unit images the display region R15 of the display unit 15. Of course, if the relative position of the user to the display unit 15 is specified on the basis of the image captured by the imaging unit, a region in which the shielding object 90 is arranged in the display region R15 may be specified on the basis of the image captured by the imaging unit.

The information processing device 10 specifies the region other than the region shielded by the shielding object 90 as a region in which the display object can be displayed, i.e., the operable range R11 and the browsable range R13 of the device, from the display region R15.

For example, FIG. 10 illustrates an example of the operable range R11 and the browsable range R13 of the device specified by the information processing device 10 in the example illustrated in FIG. 9. In FIG. 10, reference sign R33 denotes a region in which the shielding object 90 in the display region R15 is arranged. That is, the region R33 corresponds to the region shielded by the shielding object 90 in the display region R15.

As illustrated in FIG. 10, the information processing device 10 specifies the region R31 other than the region R33 specified from the display region R15 as the operable range R11 and the browsable range R13 of the device.

Also, the following operation is similar to an operation of the information processing device 10 according to the above-described embodiment. That is, the information processing device 10 specifies a range in which the position of the user Ua is a reference point, i.e., the operable range R11 and the browsable range R13 of the user Ua, according to the result of recognizing the relative position of the user Ua to the display unit 15. The information processing device 10 specifies a partial region in the display region R15 to which the display object is allocated on the basis of the specified region R31 and the operable range R11 and the browsable range R13 of the user Ua.

For example, FIG. 11 is a diagram illustrated to enable the operable range R11 and the browsable range R13 of the user Ua to be identified with respect to FIG. 10. In FIG. 11, reference sign R35 is a region obtained by subtracting the region R33 shielded by the shielding object 90 from a region in which the operable range R11 overlaps the browsable range R13 of the user Ua. That is, in an example illustrated in FIG. 11, the information processing device 10 may allocate, for example a display object associated with a task for receiving an operation of the user, to the region R35.

Through the above-described configuration, the information processing device 10 according to example 2 can display the display object by avoiding the region shielded by the shielding object 90 in the display region R15. That is, the information processing device 10 according to example 2 can present information to the user in a suitable mode even under a situation in which a part of the display region R15 is shielded by the shielding object 90.

Also, the above-described example is only one example and the present disclosure is not necessarily limited to the above-described mode. For example, if the display unit 15 is constituted of a transmission type display, the information processing device 10 may control a position at which a display object is displayed according to a position of a physical object (a real object) located at the side opposite to the user with respect to the display unit 15. Also, if the display unit 15 is constituted of the transmission type display in the present description, the user side for the display unit 15 may be referred to as a "front side" and the side opposite to the user with respect to the display unit 15 may be referred to as a "backside."

As a specific example, if the real object arranged on the backside of the display unit 15 overlaps the display object displayed on the display unit 15, the user may not browse the other object due to one of the real object and the display object. In this case, the information processing device 10 may specify the relative positions of the user and the real object to the display region R15 of the display unit 15 and control the display of the display object so that the display object does not overlap the real object on the basis of the specified relative positions.

4.3. Example 3: Example of Control According to Configuration of Form of Use of Information Processing Device Next, the information processing device according to example 3 will be described. In the above-described embodiment and examples, an example in which the information processing device 10 is constituted of a so-called tabletop display in which the display unit 15 is arranged along the xy plane (the horizontal plane) has been described. On the other hand, a positional relationship between the operable range R11 and the browsable range R13 of the user and the operable range R11 and the browsable range R13 of the device may differ according to the configuration or the form of use of the information processing device 10.

Therefore, in example 3, an example of control by the information processing device when the information processing device is configured to be different from the so-called tabletop display will be described. For example, FIGS. 12 to 15 are explanatory diagrams illustrating examples of the configuration or control of the information processing device according to example 3 and illustrate an example in which the information processing device is constituted of a portable terminal such as a so-called smartphone. Also, hereinafter, the information processing device constituted of the portable terminal may be referred to as an "information processing device 20" to distinguish it from the information processing device 10 constituted of the so-called tabletop display.

In FIGS. 12 to 15, reference sign 25 denotes a display unit of the information processing device 20. Also, in the present description, the display region of the display unit 25 will be described as being constituted of a touch panel. That is, in the examples illustrated in FIGS. 12 to 15, the display region R15 of the display unit 25 corresponds to both the operable range R11 and the browsable range R13 of the device.

Figure 12:
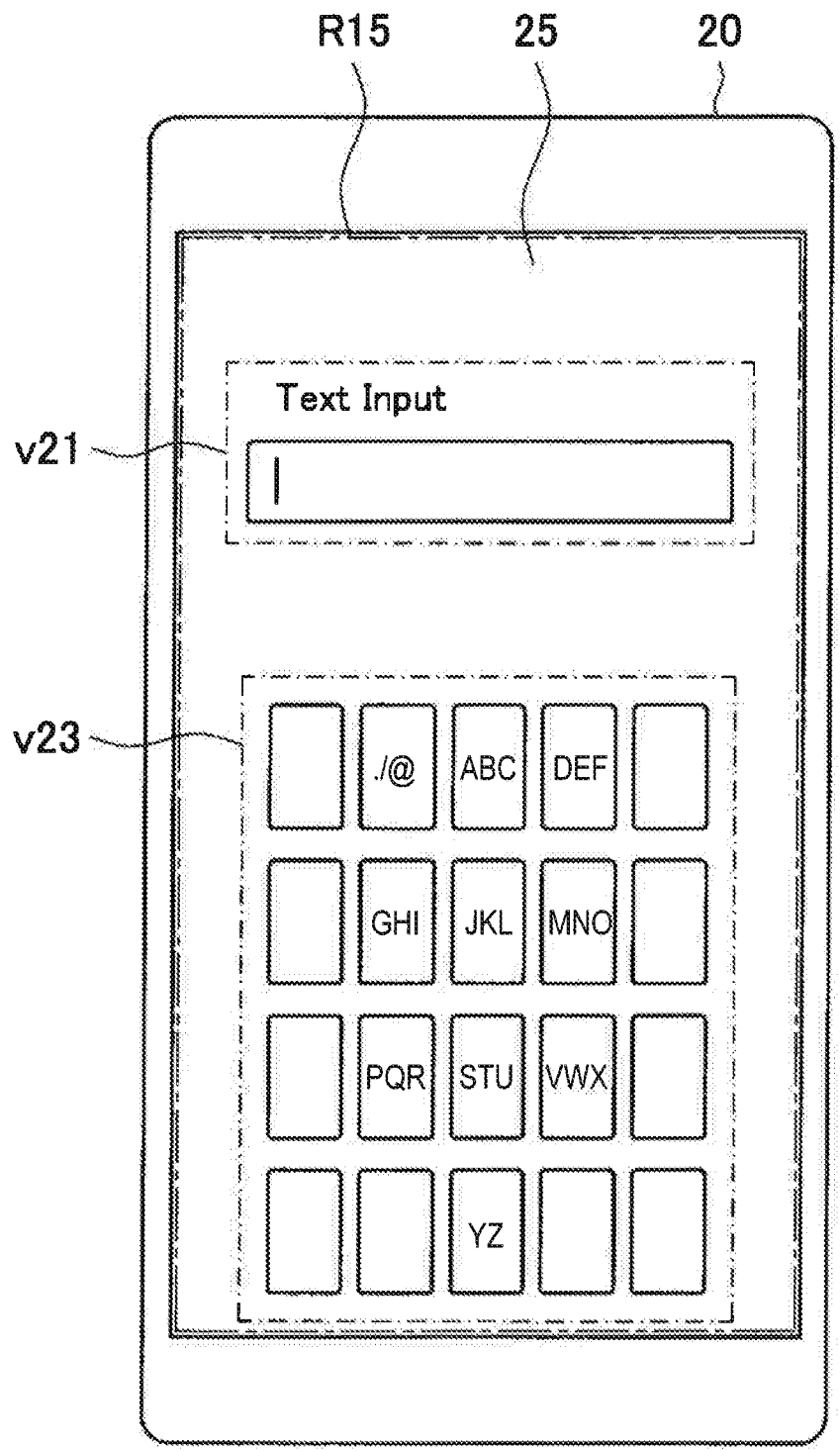
FIG. 12 is an explanatory diagram illustrating an example of a configuration or control of the information processing device according to example 3.

For example, FIG. 12 illustrates an example in which a display object v21 to which an input field of information is presented and a display object v23 to which an interface for enabling the user to input information is presented are displayed on the display unit 25 of the information processing device 20. That is, FIGS. 12 to 15 illustrate an example in which the user causes the display object v23 to be displayed by selecting the display object v21 displayed on the display unit 25 and inputs information to the display object v21 via the display object v23.

Figure 13:
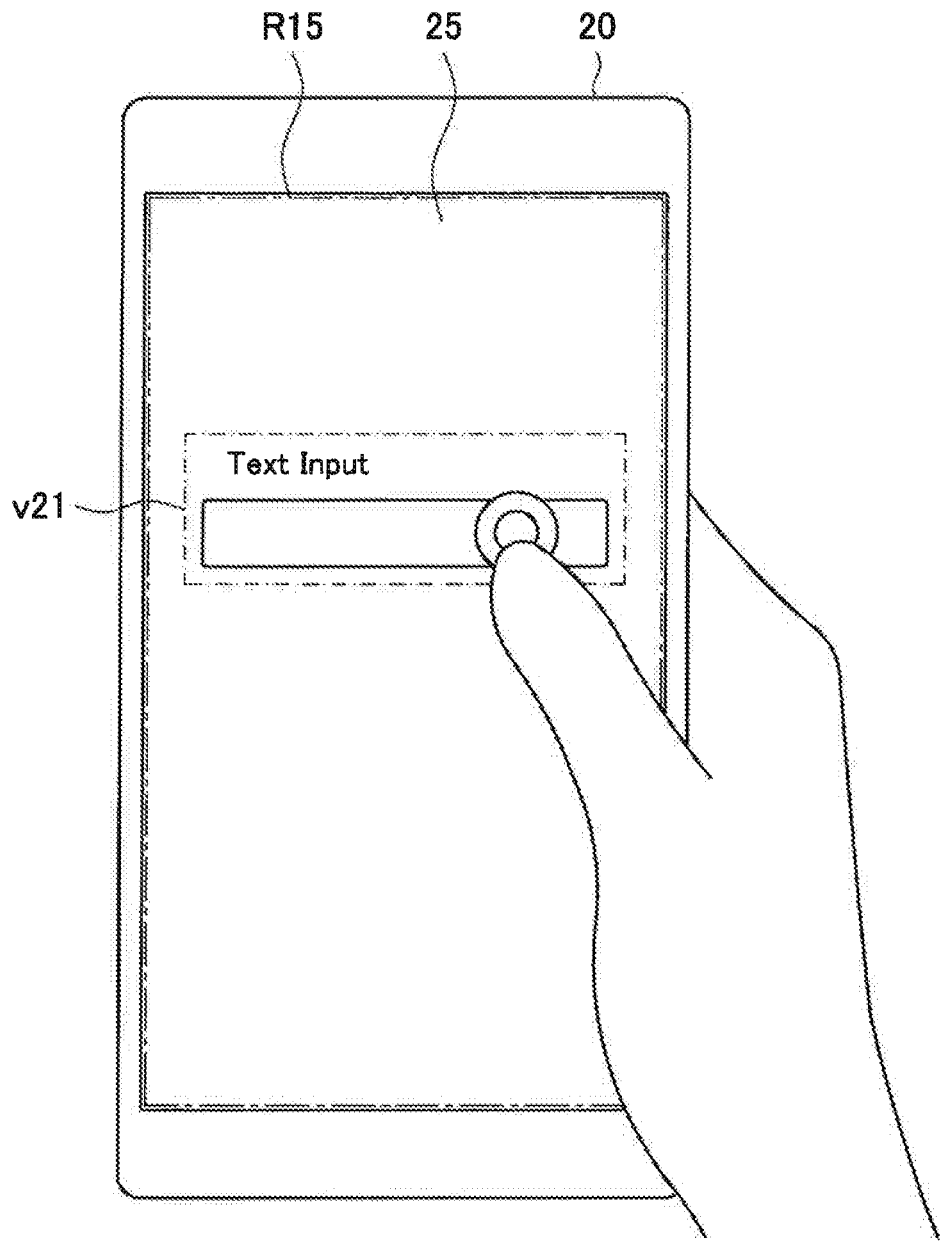
FIG. 13 is an explanatory diagram illustrating an example of a configuration or control of the information processing device according to example 3.

Also, FIG. 13 illustrates an example of the form of use of the information processing device 20 constituted of the portable terminal. The case in which the user operates the information processing device 20 with one hand as illustrated in, for example, FIG. 13, as the form of use of the information processing device 20 according to example 3 is assumed. That is, the example illustrated in FIG. 13 is an example in which the user holds the information processing device 20 in one hand and operates the touch panel provided in the display region of the display unit 25 with a finger (e.g., a thumb) of the hand holding the information processing device 20.

Figure 14:
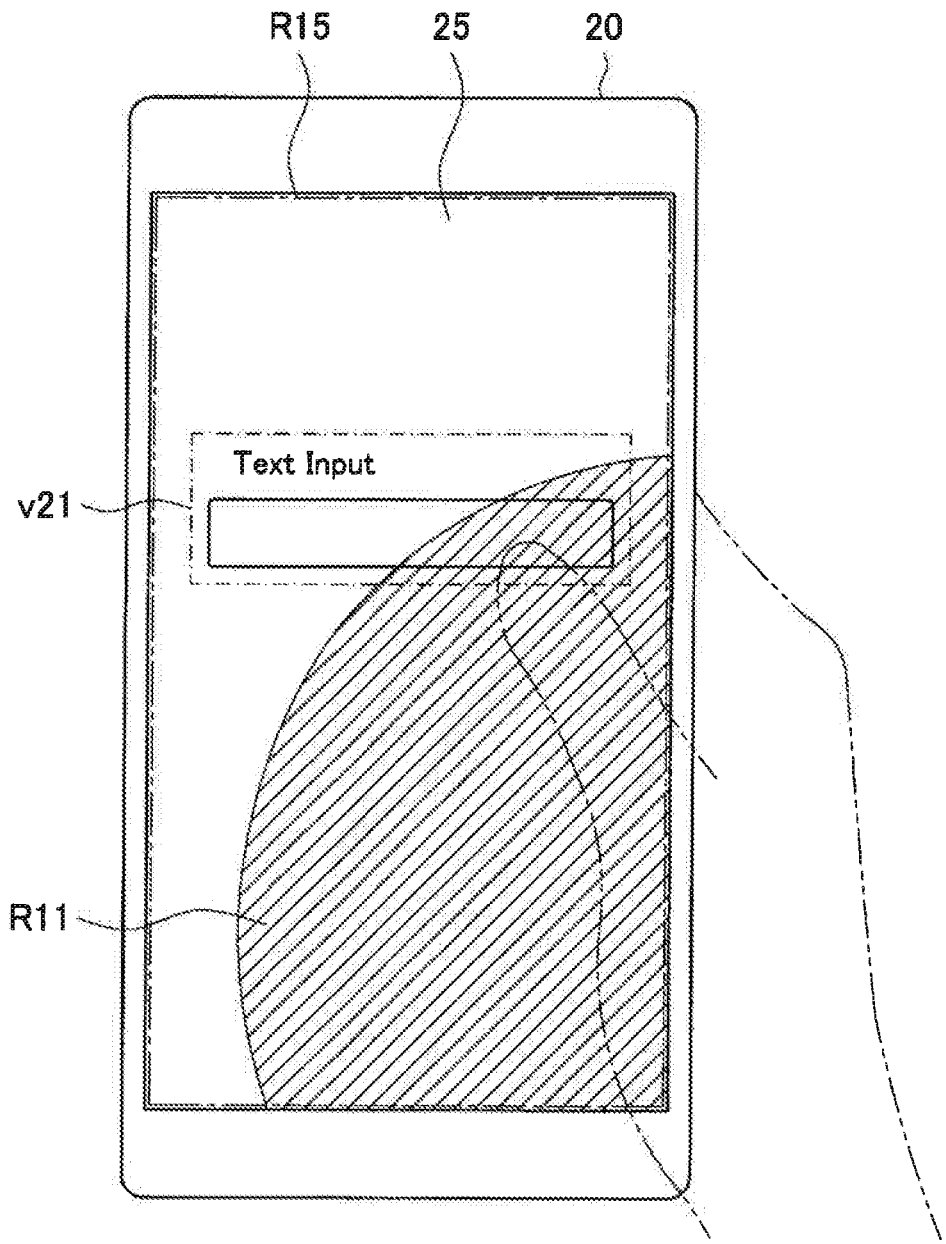
FIG. 14 is an explanatory diagram illustrating an example of a configuration or control of the information processing device according to example 3.

FIG. 14 illustrates the operable range R11 of the user when the user operates the information processing device 20 with one hand as illustrated in FIG. 13. In this case, the information processing device 20 specifies a position at which the user holds its own (i.e., the information processing device 200), i.e., a position (a relative position) of the hand of the user with respect to the information processing device 20, on the basis of, for example, detection results of various types of sensor including a proximity sensor and the like.

The information processing device 20 specifies a movable range of the finger on the basis of the specified position of the hand of the user and an estimated length of the finger of the user and recognizes the specified movable range as the operable range R11 of the user.

Also, in the case of the information processing device 20 constituted of the portable terminal, the size of the display unit 25 is relatively small and a situation in which only a part of the display region of the display unit 25 is in a field of view of the user is little. Thus, the information processing device 20 may always recognize the entire display region R15 of the display unit 25 as the browsable range R13 of the user.

The information processing device 20 controls the display of the display object on the display region R15 on the basis of the specified operable range R11 of the user and the display region R15 of the display unit 25.

For example, FIG. 14 illustrates a state in which the user selects a display object serving as an input destination of information, i.e., a state in which the input destination of the information is not selected. In this case, for example, the information processing device 20 controls a display position of the display object v21 so that at least a part of the display object v21 for receiving an input of the user is included within the specified operable range R11 of the user.

Figure 15:
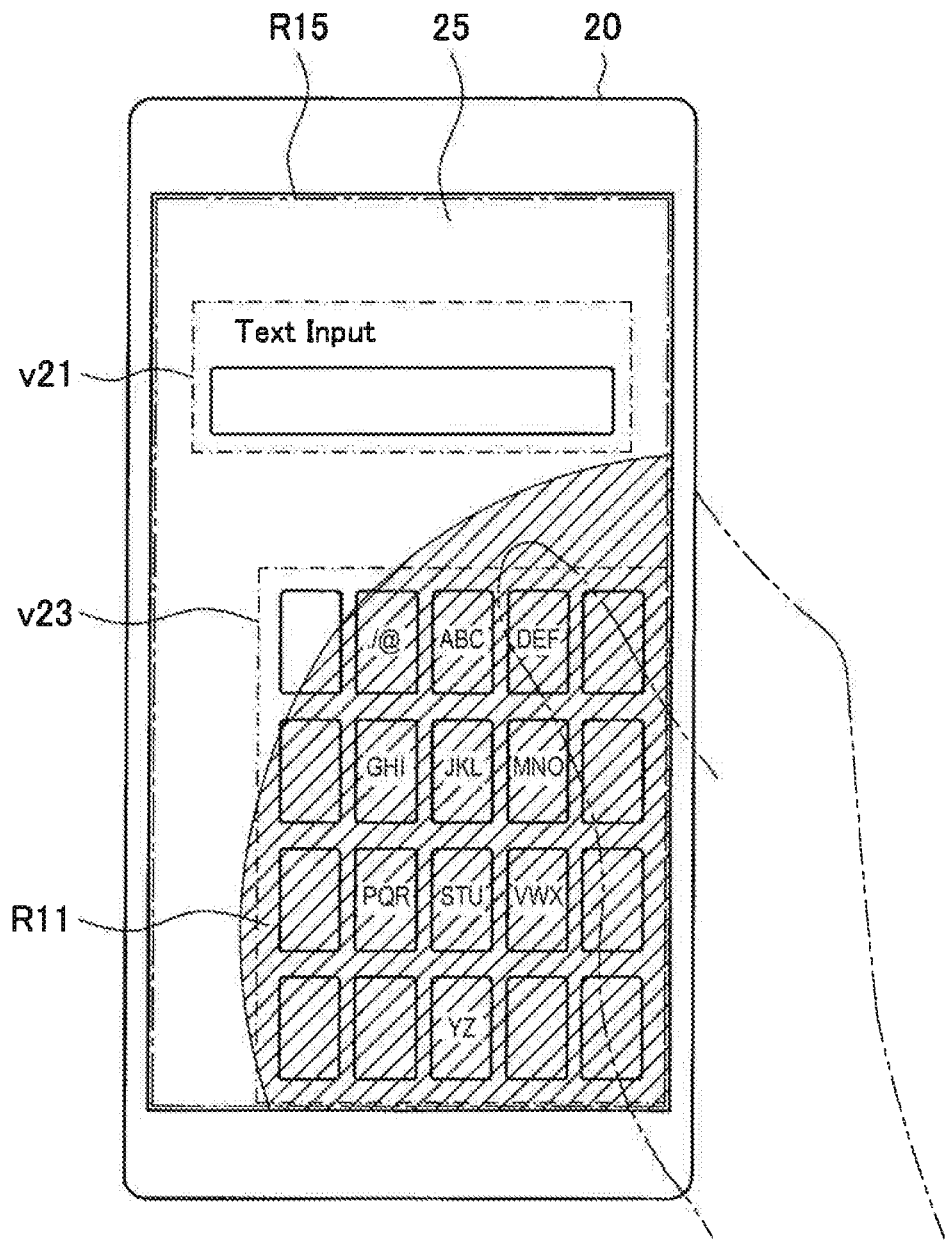
FIG. 15 is an explanatory diagram illustrating an example of a configuration or control of the information processing device according to example 3.

Also, FIG. 15 illustrates an example in which the display object v21 is selected and the information processing device 20 causes the display object v23 for enabling the user to input information to the display object v21 to be displayed. That is, FIG. 15 illustrates a state in which the user inputs the information to the display object v21 via the display object v23 displayed according to selection of the display object v21. In this case, a task associated with the display object v23 corresponds to a task for receiving an operation from the user.

That is, in the example illustrated in FIG. 15, the information processing device 20 controls the display position of the display object v23 so that the display object v23 is included within the operable range R11 of the user as much as possible. For example, because the user holds the right side of the information processing device 20 in the example illustrated in FIG. 15, the operable range R11 of the user is provided in a region of the right side of the display region R15 of the display unit 15. Thus, the information processing device 20 controls the display position of the display object v23 to the right so that the display object v23 is included in the operable range R11 of the user as much as possible.

On the other hand, in the example illustrated in FIG. 15, the task associated with the display object v21 mainly corresponds to a task for presenting information input via the display object v23. Thus, the information processing device 20 causes the display object v21 to be displayed outside the operable range R11 of the user so that the operable range R11 can be effectively utilized as a region for displaying the display object v23.

As example 3, an example of control by the information processing device when the information processing device is constituted of the portable terminal such as a so-called smartphone has been described with reference to FIGS. 12 to 15. Of course, the above is only an example and it is needless to say that a method of detecting a position of the user or content of display control of the display object may be appropriately switched according to a configuration or a form of use of the information processing device.

Figure 16:
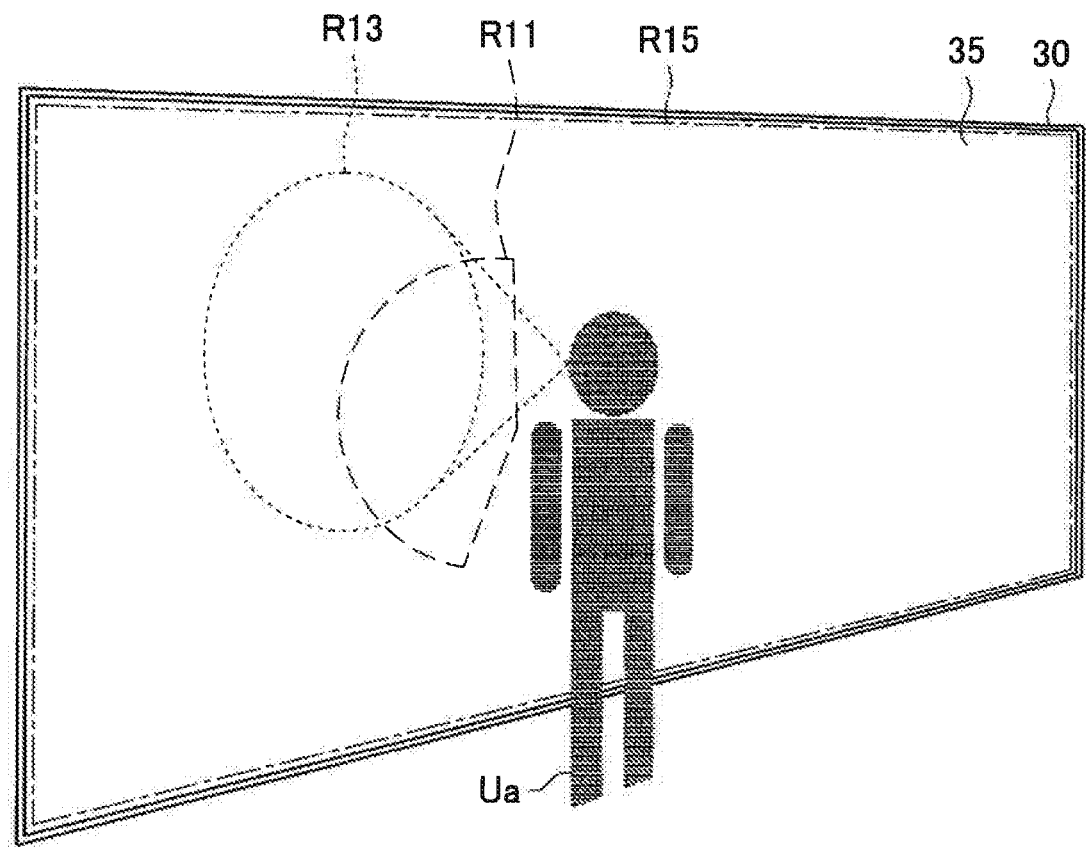
FIG. 16 is an explanatory diagram illustrating another mode of the information processing device according to the embodiment.
Figure 16:
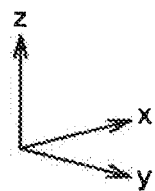

For example, FIG. 16 is an explanatory diagram illustrating another mode of the information processing device according to the present embodiment and illustrates an example in which an information processing device 20 including a relatively large display unit 35 (e.g., a large display) is installed on a wall surface. In the example illustrated in FIG. 16, an xy plane formed in an x-direction and a y-direction orthogonal to each other is designated as a horizontal plane and a direction perpendicular to the xy plane (that is, a vertical direction) is designated as a z-direction. That is, in the example illustrated in FIG. 16, the information processing device 30 is installed so that the display unit 35 of the information processing device 30 stands up in the z-direction (the vertical direction) (e.g., so that the display unit 35 is perpendicular to the ground).

Because the display unit 35 stands up in the z-direction (the vertical direction) in the example illustrated in FIG. 16, the display region R15 of the display unit 35 is provided to face the user Ua. Thus, in the case of the example illustrated in FIG. 16, for example, it is only necessary to provide a device for detecting a position or an orientation of the user Ua (various types of sensors or an imaging unit) so that the information processing device 30 can specify a relative position (the position or the orientation) of the user Ua located at a front surface of the display unit 35 to the display unit 35.

As a specific example, the information processing device 30 may specify the position or the orientation of the user located in a region by analyzing an image of the region of a front surface of the display unit 35 imaged by the imaging unit.

Of course, it is only necessary for the information processing device 30 to specify the operable range R11 and the browsable range R13 of the user Ua on the basis of the specified relative position of the user Ua to the display unit 35 as in the information processing device 10 according to the above-described embodiment.

For example, reference sign R11 in FIG. 16 denotes an example of the operable range of the user Ua. That is, in the example illustrated in FIG. 16, the information processing device 30 specifies a range in which the hand of the user Ua reaches as the operable range R11 of the user Ua using the position of the user Ua as a reference point. As a specific example, it is necessary for the information processing device 30 to specify the movable range of the arm defined on the basis of the length of the arm of the user Ua as the operable range R11 of the user Ua using a position of a shoulder of the user Ua as the reference point.

Also, reference sign R13 in FIG. 16 denotes an example of a browsable range of the user Ua. That is, in the example illustrated in FIG. 16, the information processing device 30 specifies a range capable of being placed in a field of view of the user Ua as the browsable range R13 of the user Ua using the position of the user Ua as a reference point. As a specific example, it is necessary for the information processing device 30 to specify the field of view of the user Ua defined to be wide in a direction in which the head is directed as the browsable range R13 of the user Ua using a position of the head of the user Ua as the reference point.

Also, because the operation after the operable range R11 and the browsable range R13 of the user Ua are specified is similar to that of the information processing device 10 according to the above-described embodiment, detailed description will be omitted.

Figure 17:
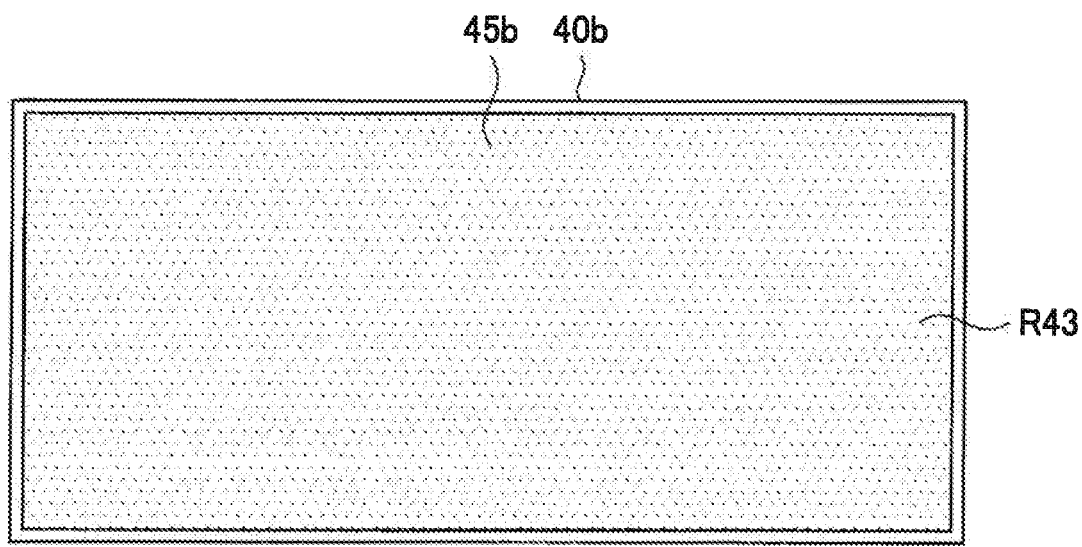
FIG. 17 is an explanatory diagram illustrating an example of a configuration or control of the information processing device according to example 4.
Figure 17:
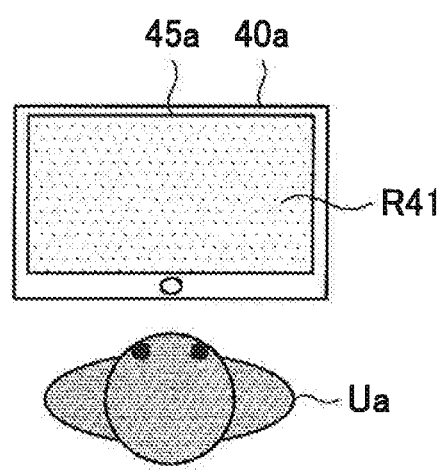
Figure 18:
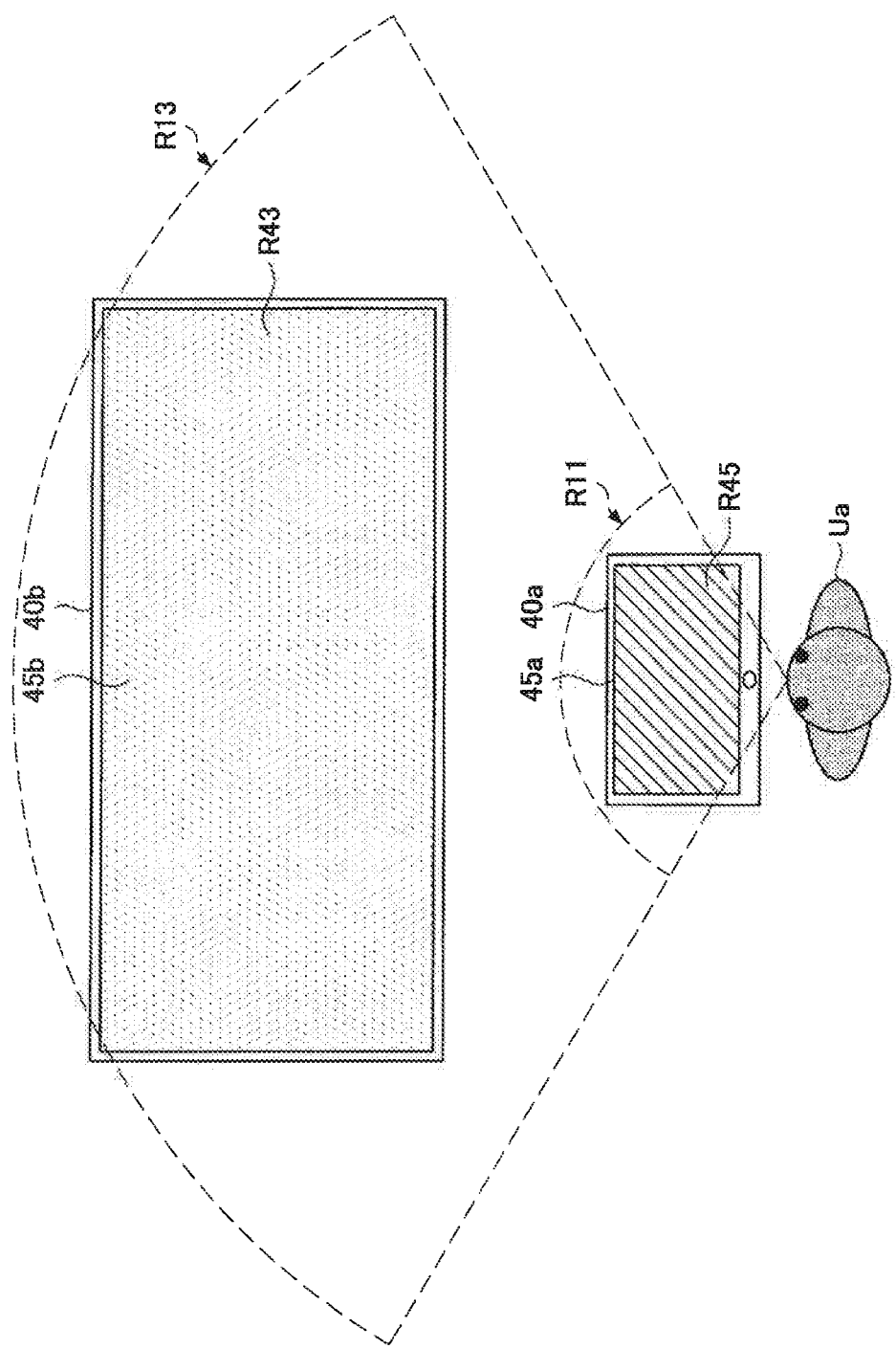
FIG. 18 is an explanatory diagram illustrating an example of a configuration or control of the information processing device according to example 4.

4.4. Example 4: Example in which Plurality of Devices Cooperate with One Another Next, an application example for the information processing system in which a plurality of devices cooperatively operate will be described as example 4 with reference to FIGS. 17 and 18. FIGS. 17 and 18 are explanatory diagrams illustrating examples of a configuration and control of the information processing system according to example 4.

In example 4, an example in which an information processing device 40*a* constituted of a so-called portable terminal such as a tablet terminal and an information processing device 40*b* having a relatively large display unit 45*b* cooperates with each other is shown as illustrated in FIG. 17. The information processing device 40*b* may be constituted of, for example, a so-called tabletop display as illustrated in FIG. 1, a large display illustrated in FIG. 16, or the like. Also, as another example, the information processing device 40*b* may be constituted of a so-called projector which presents information to the user by projecting the information onto a projection surface using a wall surface or the like as the projection surface.

Also, in FIG. 17, reference sign 45*a* denotes a display unit of the information processing device 40*a* and reference sign R41 denote a display region of the display unit 45*a*. Also, reference sign R43 denotes a display region of the display unit 45*b*. Also, in the example illustrated in FIG. 17, the display region R41 of the display unit 45*a* is assumed to be constituted of a touch panel. Also, in the example illustrated in FIG. 17, the display region R43 of the display unit 45*b* is assumed not to be constituted of a touch panel to make the description easier to understand.

That is, the information processing system according to example 4 recognizes that the display region R41 of the display unit 45*a* is the operable range R11 of the device and is the browsable range R13 of the device on the basis of device information corresponding to the information processing device 40*a*. Also, the information processing system recognizes that the display region R43 of the display unit 45*b* is the browsable range R13 of the device on the basis of the device information corresponding to the information processing device 40*b*.

Also, the information processing system according to example 4 recognizes a relative position of the user Ua for each of the display units 45*a* and 45*b* on the basis of various types of sensors such as a distance sensor, a proximity sensor, a human detection sensor, and an infrared sensor or a result of detection by a detection device such as an imaging unit. Also, at this time, the information processing system may recognize a relative position between the display unit 45*a* and the display unit 45*b*. As a specific example, the information processing system may recognize a relative position among the display unit 45*a*, the display unit 45*b*, and the user Ua by analyzing an image in which the display units 45*a* and 45*b* and the user Ua are imaged by the imaging unit.

The information processing system specifies the operable range R11 and the browsable range R13 of the user Ua according to a result of recognizing a relative position among the display unit 45*a*, the display unit 45*b*, and the user Ua.

For example, FIG. 18 is a diagram illustrated to enable the operable range R11 and the browsable range R13 of the user Ua to be identified with respect FIG. 17.

In FIG. 18, reference sign R45 is a region in which the operable range R11 of the user Ua overlaps the display range R41 of the display unit 45*a*. The information processing system according to example 4 may allocate, for example, a display object associated with a task for receiving an operation of the user, to the region R45.

Also, the information processing system may allocate a display object associated with a task for only presenting information to the user to a region in which one of the display ranges R41 and R43 overlaps the browsable range R13 of the user Ua.

Also, if a plurality of display regions are candidates, the information processing system may determine a region to which the display object is allocated according to a configuration or a type of the device provided in the information processing device corresponding to each display region.

As a specific example, the information processing system specifies the display range R41 corresponding to the information processing device 40*a* and the display range R43 corresponding to the information processing device 40*b* as candidates for an allocation destination of a display object associated with a task according to voice output. At this time, the information processing system may allocate the display object to a display range corresponding to an information processing device in which voice output is possible (e.g., including a speaker) on the basis of device information of each of the information processing devices 40*a* and 40*b*.

Also, the above-described specification of the ranges R11, R13, R41, R43, and R45 and the above-described main agent which controls the display object are not particularly limited. As a specific example, one of the information processing devices 40*a* and 40*b* may perform an initiative operation to implement the above-described control.

Also, as another example, the information processing devices 40*a* and 40*b* operate independently of each other and cooperate with each other by mutually sharing information to implement the above-described control. As a specific example, the information processing device 40*a* may recognize the relative position of the user Ua to the display unit 45*a* and share the recognized information with the information processing device 40*b*. Likewise, the information processing device 40*b* may recognize the relative position of the user Ua to the display unit 45*b* and share the recognized information with the information processing device 40*a*. Also, at least one of the information processing devices 40*a* and 40*b* may be configured to recognize a relative position between the information processing devices 40*a* and 40*b* and share the recognized information between the information processing devices 40*a* and 40*b*. Thus, the information processing devices 40*a* and 40*b* may cooperate with each other to control the display of the display object in the display regions R41 and R43 by sharing various types of information between the information processing devices 40*a* and 40*b*.

Also, as another example, an external device different from the information processing devices 40*a* and 40*b* is provided and the external device may serve as a main agent to implement the above-described control.

An application example for the information processing system in which a plurality of devices operate in cooperation with one another has been described as example 4 with reference to FIGS. 17 and 18. If there are a plurality of display units as described above, it is only necessary for the information processing system to specify the browsable range R13 of the device for each display unit. The same is true for the operation unit. That is, if there are a plurality of operation units, it is only necessary for the information processing system to specify the operable range R11 of the device for each operation unit.

As described above, it is only necessary for the information processing system to specify the operable range R11 and the browsable range R13 of each of a plurality of devices and specify a region serving as an allocation destination of the display object by comparing the operable range R11 and the browsable range R13 of the user.

Through the above-described configuration, the information processing system according to example 4 can present information to the user in a suitable mode by causing a plurality of devices to cooperate with one another.

5. Hardware Configuration

Figure 19:
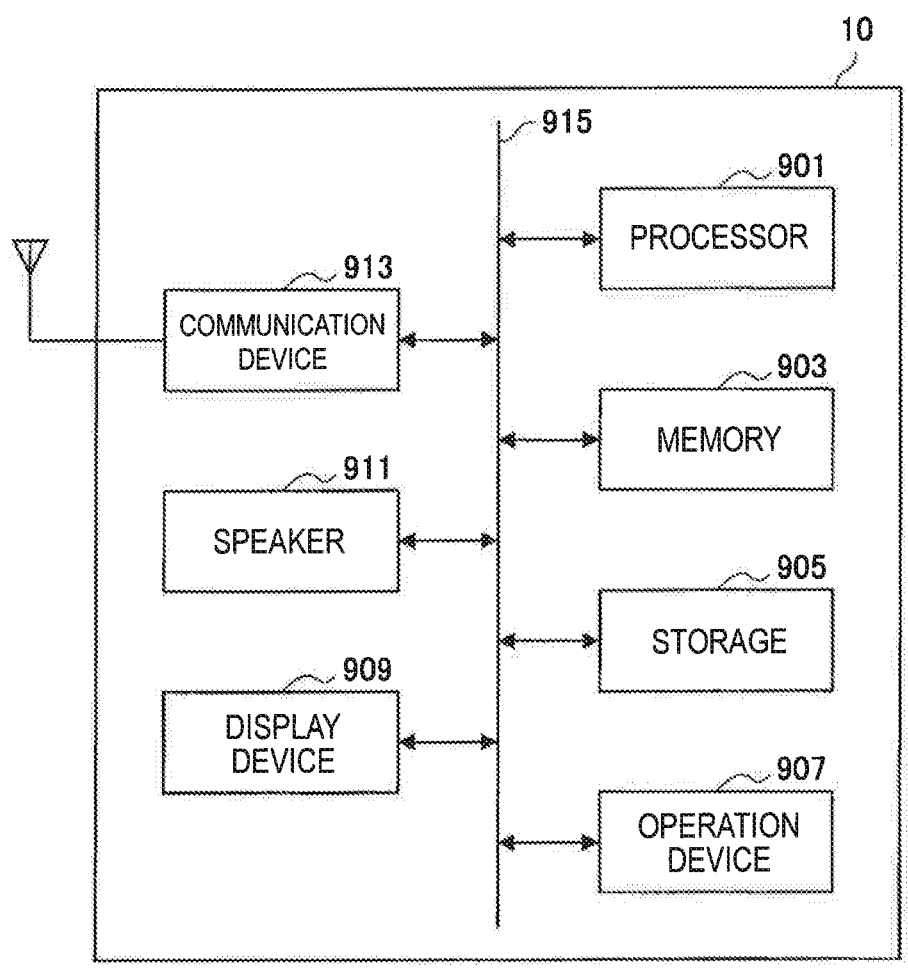
FIG. 19 is a diagram illustrating an example of a hardware configuration of the information processing device according to the embodiment of the present disclosure.

Next, an example of the hardware configuration of the information processing device 10 according to each embodiment of the present disclosure will be described with reference to FIG. 19. FIG. 19 is a diagram illustrating an example of the hardware configuration of the information processing device 10 according to the embodiment of the present disclosure.

As illustrated in FIG. 19, the information processing device 10 according to the present embodiment may include a processor 901, a memory 903, a storage 905, an operation device 907, a display device 909, a detection device 915, and a bus 917. Also, the information processing device 10 may include a speaker 911 and a communication device 913.

The processor 901 may be, for example, a central processing unit (CPU), a graphics processing unit (GPU), a digital signal processor (DPS), or a system on chip (SoC), and executes various processes of the information processing device 10. The processor 901 can be constituted of, for example, an electronic circuit which executes various types of calculation processes. Also, each component of the above-described control unit 11 may be executed by the processor 901.

The memory 903 includes a random access memory (RAM) and a read only memory (ROM) and stores programs to be executed by the processor 901 and data. The storage 905 may include a storage medium such as a semiconductor memory or a hard disk. For example, the above-described storage unit 17 may constituted of at least one of the memory 903 and the storage 905 and a combination thereof.

The operation device 907 has a function of generating an input signal for enabling the user to perform a desired operation. The operation device 907 may be constituted of, for example, a touch panel. Also, as another example, the operation device 907 may be constituted of input units for enabling the user to input information such as, for example, a button and a switch, an input control circuit which generates an input signal on the basis of an input by the user and supplies the generated input signal to the processor 901, etc. Also, the above-described operation unit 13 may be implemented by the operation device 907.

The display device 909 is an example of an output device and may be a device such as, for example, a liquid crystal display (LCD) device or an organic EL (light emitting diode (OLED)) display. In this case, the display device 909 can present predetermined information to the user by displaying the screen. Also the above-described display unit 15 may be implemented by the display device 909.

The speaker 911 is an example of an output device for outputting a sound signal or a voice signal.

The communication device 913 is a communication means provided in the information processing device 10 and communicates with an external device via a network. The communication device 913 is a wired or wireless communication interface. The communication device 913 may include a communication antenna, a radio frequency (RF) circuit, a baseband processor, etc. if the communication device 913 is constituted of a wireless communication interface.

The communication device 913 can have a function of performing various types of signal processing on a signal received from the external device and supply a digital signal generated from a received antenna signal to the processor 901.

The detection device 915 is a device for detecting a position or an orientation of the user located in the vicinity of the information processing device 10. The detection device 915 may be constituted of various types of sensors such as, for example, a distance sensor, a proximity sensor, a human detection sensor, and an infrared sensor. Also, as another example, the detection device 915 may be constituted of an imaging device such as a camera which captures an image if the position or the orientation of the user located in the vicinity of the information processing device 10 is detected by analyzing the image. Also, the above-described detection unit 19 may be implemented by the detection device 915.

The bus 917 mutually connects the processor 901, the memory 903, the storage 905, the operation device 907, the display device 909, the speaker 911, the communication device 913, and the detection device 915. The bus 917 may include a plurality of types of buses.

Also, a program for causing hardware such as the processor, the memory, and storage embedded in the computer to exhibit a function equivalent to that of a configuration provided in the above-described information processing device 10 can also be created. Also a computer-readable storage medium recording the program may also be provided.

6. Conclusion

As described above, the information processing device 10 according to the present embodiment specifies a range in which a position of a user is a reference point according to a result of recognizing a relative position of the user to the display unit 15. The information processing device 10 controls the display of the display object on the display unit 15 on the basis of the specified range in which the position of the user is the reference point and the display region R15 of the display unit 15. Through the above-described configuration, the information processing device 10 according to the present embodiment can present information to the user in a suitable mode by controlling a position or an orientation of the display object in the display unit 15 according to the position or the orientation of the user with respect to the display unit 15.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)
A display control device including:
a calculation unit configured to specify a first region in which a user is a reference point; and a display control unit configured to control display of a display object on a display unit according to the specified first region and a second region occupied by the display unit.

(2) The display control device according to (1), wherein the calculation unit specifies the first region on the basis of a position of the user with respect to an operation device.

(3) The display control device according to (2), wherein the calculation unit specifies the first region according to the position of the user with respect to the operation device and a type of the operation device.

(4) The display control device according to (1), wherein the calculation unit specifies the first region on the basis of a field of view of the user.

(5) The display control device according to (4), wherein the calculation unit estimates the field of view of the user on the basis of a position and an orientation of the user.

(6) The display control device according to any one of (1) to (5), wherein the calculation unit corrects the first region according to a detected state of the user.

(7) The display control device according to any one of (1) to (6), wherein the calculation unit corrects the first region according to control information set in association with the user.

(8) The display control device according to any one of (1) to (7), wherein
the calculation unit specifies the first region for each of a plurality of users, and
the display control unit controls the display of the display object on the display unit on the basis of first regions corresponding to the plurality of users and the second region.

(9) The display control device according to (8), wherein the display control unit controls the display of the display object on the display unit on the basis of an overlapping region in which the first regions corresponding to the plurality of users overlap each other and the second region.

(10) The display control device according to (8), wherein the display control unit controls the display of the display object for each of the plurality of users according to control information set for each of the plurality of users.

(11) The display control device according to (10), wherein the display control unit presents the display object to the plurality of users in a mode according to the control information common among the plurality of users.

(12) The display control device according to any one of (1) to (11), wherein the display control unit controls display of another display object different from the display object according to a display state of the display object in an overlapping region in which the first region and the second region overlap.

(13) The display control device according to any one of (1) to (12), wherein
the calculation unit specifies a third region specified on the basis of a position of the user with respect to an operation device and a fourth region based on a field of view of the user as the first region, and
the display control unit selects one of the third region and the fourth region according to a process associated with the display object and controls the display of the display object on the display unit on the basis of the selected region and the second region.

(14) The display control device according to any one of (1) to (13), wherein the display control unit limits the second region according to a position of a real object overlapping a region in which the display unit displays information.

(15) The display control device according to any one of (1) to (14), wherein the display control unit controls the display of the display object on at least one of a plurality of the display units according to the first region and the second region corresponding to each of the plurality of the display units.

(16) The display control device according to any one of (1) to (15), including:
the display unit.

(17) The display control device according to (16), wherein the display unit is provided to extend in a horizontal direction.

(18) A display control method including:
specifying a first region in which a user is a reference point; and
controlling, by a processor, display of a display object on a display unit according to the specified first region and a second region occupied by the display unit.

(19) A program for causing a computer to execute:
specifying a first region in which a user is a reference point; and
controlling display of a display object on a display unit according to the specified first region and a second region occupied by the display unit.

REFERENCE SIGNS LIST 10 information processing device
11 control unit
111 process execution unit
113 context information acquisition unit
115 calculation unit
117 display control unit
13 operation unit
15 display unit
17 storage unit
19 detection unit
20 information processing device
25 display unit
30 information processing device
35 display unit
40a, 40b information processing device
45a, 45b display unit

The invention claimed is:
1. A display control device comprising:
a calculation unit configured to specify browsable ranges and operable ranges such that a browsable range and an operable range are respectively specified for a position of each respective user of a plurality of users used as reference points; and a display control unit configured to control display of a display object based on at least one of the specified browsable ranges or the specified operable ranges, wherein, for each respective user of the plurality of users, at least part of the respective browsable range is specified outside the respective operable range with respect to the position of the respective user of the plurality of users that is used as a reference point, wherein the display control unit further controls the display of the display object based on overlap between a display region in which the display object is displayed and at least one of the respective browsable range or the respective operable range corresponding to at least one respective user of the plurality of users, and wherein the calculation unit and the display control unit are each implemented via at least one processor.

2. The display control device according to claim 1, wherein the calculation unit further specifies the browsable ranges and the operable ranges on the basis of the positions of the plurality of users with respect to an operation device.

3. The display control device according to claim 2, wherein the calculation unit further specifies the browsable ranges and the operable ranges according to a type of the operation device.

4. The display control device according to claim 1, wherein the calculation unit further specifies the browsable ranges and the operable ranges on the basis of fields of view of the plurality of users.

5. The display control device according to claim 4, wherein the calculation unit estimates a field of view of each user of the plurality of users on the basis of the position and an orientation of the user.

6. The display control device according to claim 1, wherein the calculation unit corrects the browsable ranges and the operable ranges according to a detected state of the plurality of users.

7. The display control device according to claim 1, wherein the calculation unit corrects the browsable ranges and the operable ranges according to control information set in association with the plurality of users.

8. The display control device according to claim 1, wherein
the display control unit further controls the display of the display object on the basis of the respective browsable ranges or the respective operable ranges corresponding to multiple respective users of the plurality of users.

9. The display control device according to claim 8, wherein the display control unit further controls the display of the display object on the basis of an overlapping region in which the respective browsable ranges or the respective operable ranges corresponding to the multiple respective users of the plurality of users overlap each other within the display region.

10. The display control device according to claim 8, wherein the display control unit further controls the display of the display object for each respective of the plurality of users according to control information set for the respective user.

11. The display control device according to claim 10, wherein the display control unit presents the display object to the plurality of users in a mode according to the control information common among the plurality of users.

12. The display control device according to claim 8, wherein the display unit further controls the display of the display object on the basis of an overlapping region in which the respective operable ranges corresponding to the multiple respective users of the plurality of users overlap each other within the display region.

13. The display control device according to claim 1, wherein the display control unit controls display of another display object different from the display object according to a display state of the display object in an overlapping region in which the respective browsable ranges of multiple respective users of the plurality of users overlap each other within the display region.

14. The display control device according to claim 1, wherein the display control unit is further configured to determine a position of a real object overlapping at least one of the browsable ranges or the operable ranges, and
wherein the display control unit further controls display of the display object based on the determined position of the real object.

15. The display control device according to claim 1, wherein the display object is displayed by a display unit.

16. The display control device according to claim 15, wherein the display unit is provided to extend in a horizontal direction.

17. The display control device according to claim 15, wherein the display unit comprises at least one of a projector or a tabletop display.

18. The display control device according to claim 1, wherein the display control unit further controls display of the display object to a region in which some of the browsable ranges or the operable ranges corresponding to multiple users of the plurality of users overlap each other within the display region.

19. The display control device according to claim 1, wherein the display control unit further controls display of the display object to a region in which the browsable ranges and the operable ranges of the plurality of users do not overlap.

20. The display control device according to claim 1, wherein the display control unit is further configured to determine a partial region within at least one of the browsable ranges or the operable ranges to which the display object is displayed based on setting information of each user of the plurality of users.

21. The display control device according to claim 20, wherein the setting information includes a language of information of each user of the plurality of users.

22. The display control device according to claim 1, wherein the display control unit is further configured to specify the orientation of the display object based on the positions of the plurality of users.

23. The display control device according to claim 1, wherein the browsable ranges and the operable ranges are further specified based on at least one of user information or device information.

24. The display control device according to claim 23, wherein the user information comprises information indicating a state or an attribute of each respective user of the plurality of users.

25. The display control device according to claim 24, wherein the information indicating the state or the attribute of each respective user comprises one or more of position information, line-of-sight information, and human body information.

26. The display control device according to claim 24, wherein the user information comprises information pre-registered based on an operation of each respective user as setting information of the respective user.

27. The display control device according to claim 26, wherein the setting information comprises a language used by the respective user or authority information indicating a role of the respective user.

28. The display control device according to claim 23, wherein the device information comprises information indicating a type or a characteristic of the display control device.

29. The display control device according to claim 1, wherein the display unit further controls display of the display object based on task information.

30. The display control device according to claim 29, wherein the task information comprises information about an operation state of a task serving as an execution target.

31. A display control method comprising:
    specifying browsable ranges and operable ranges such that a browsable range and an operable range are respectively specified for a position of each respective user of a plurality of users used as reference points; and
    controlling, by a processor, display of a display object based on at least one of the specified browsable ranges or the specified operable ranges,
    wherein, for each respective user of the plurality of users, at least part of the respective browsable range is specified outside the respective operable range with respect to the position of the respective user of the plurality of users that is used as a reference point, and
    wherein the display of the display object is further controlled based on overlap between a display region in which the display object is displayed and at least one of the respective browsable range or the respective operable range corresponding to at least one respective user of the plurality of users.

32. A non-transitory computer-readable medium having embodied thereon a program, which when executed by a computer causes the computer to execute a method, the method comprising:
    specifying browsable ranges and operable ranges such that a browsable range and an operable range are respectively specified for a position of each respective user of a plurality of users used as reference points; and
    controlling display of a display object based on at least one of the specified browsable ranges or the specified operable ranges,
    wherein, for each respective user of the plurality of users, at least part of the respective browsable range is specified outside the respective operable range with respect to the position of the respective user of the plurality of users that is used as a reference point, and
    wherein the display of the display object is further controlled based on overlap between a display region in which the display object is displayed and at least one of the respective browsable range or the respective operable range corresponding to at least one respective user of the plurality of users.

* * * * *